US010809894B2

(12) United States Patent
Chhabra et al.

(10) Patent No.: US 10,809,894 B2
(45) Date of Patent: Oct. 20, 2020

(54) ELECTRONIC DEVICE FOR DISPLAYING OBJECT OR INFORMATION IN THREE-DIMENSIONAL (3D) FORM AND USER INTERACTION METHOD THEREOF

(71) Applicant: SAMSUNG ELECTRONICS CO., LTD., Suwon-si (KR)

(72) Inventors: Manish Chhabra, Noida (IN); Monil Parmar, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 459 days.

(21) Appl. No.: 14/815,429

(22) Filed: Jul. 31, 2015

(65) Prior Publication Data

US 2016/0034147 A1 Feb. 4, 2016

(30) Foreign Application Priority Data

Aug. 2, 2014 (IN) .......................... 2198/DEL/2014
May 21, 2015 (KR) ........................ 10-2015-0070898

(51) Int. Cl.
*G06F 3/0484* (2013.01)
*G06F 3/0481* (2013.01)
*G09G 3/00* (2006.01)

(52) U.S. Cl.
CPC ...... *G06F 3/04842* (2013.01); *G06F 3/04815* (2013.01); *G09G 3/003* (2013.01); *G09G 2300/023* (2013.01)

(58) Field of Classification Search
CPC combination set(s) only.
See application file for complete search history.

(56) References Cited

U.S. PATENT DOCUMENTS

| 7,685,519 B1* | 3/2010 | Duncan ................. G06F 9/4446 715/705 |
| 8,035,635 B2 | 10/2011 | Shefi |
| 8,321,783 B2 | 11/2012 | Dupuis-Latour et al. |
| 8,436,891 B2 | 5/2013 | Gefen et al. |
| 8,533,580 B1 | 9/2013 | Xu |
| 8,860,717 B1* | 10/2014 | Zeiger .................... G06T 13/00 345/419 |

(Continued)

FOREIGN PATENT DOCUMENTS

| CN | 102598680 A | 7/2012 |
| CN | 103037073 A | 4/2013 |

(Continued)

OTHER PUBLICATIONS

S. Hagen and F. E. Sandnes, "Visual Scoping of Private Information Displayed on Shared Tabletop Surfaces," 2010 7th International Conference on Ubiquitous Intelligence & Computing and 7th International Conference on Autonomic & Trusted Computing, Xian, Shaanxi, 2010, pp. 121-125. (Year: 2010).*

(Continued)

*Primary Examiner* — James T Tsai
(74) *Attorney, Agent, or Firm* — Sughrue Mion, PLLC

(57) ABSTRACT

An interaction method of an electronic device is provided. The method includes displaying web content comprising at least one object on a first viewing pane, detecting a selection of the at least one object by a first user, and displaying the selected object or information linked with the selected object on a second viewing pane in three dimensional (3D) form.

16 Claims, 44 Drawing Sheets

(56) References Cited

U.S. PATENT DOCUMENTS

| | | | |
|---|---|---|---|
| 9,013,474 B2 | 4/2015 | Park et al. | |
| 2003/0197737 A1 | 10/2003 | Kim | |
| 2004/0100489 A1 | 5/2004 | Berestov et al. | |
| 2005/0086612 A1* | 4/2005 | Gettman | G06F 3/04815 715/848 |
| 2009/0083760 A1* | 3/2009 | Slaight | G06F 13/4022 719/313 |
| 2010/0083096 A1* | 4/2010 | Dupuis-Latour | G06F 17/212 715/234 |
| 2011/0084893 A1* | 4/2011 | Lee | G06F 1/1649 345/6 |
| 2011/0109729 A1 | 5/2011 | Yoo et al. | |
| 2011/0157170 A1* | 6/2011 | Bennett | G06F 3/14 345/419 |
| 2011/0159929 A1* | 6/2011 | Karaoguz | H04N 21/4312 455/566 |
| 2011/0161843 A1 | 6/2011 | Bennett et al. | |
| 2011/0320969 A1 | 12/2011 | Hwang et al. | |
| 2012/0127156 A1 | 5/2012 | Goossens et al. | |
| 2012/0174038 A1 | 7/2012 | Tamayo et al. | |
| 2012/0179983 A1 | 7/2012 | Lemire | |
| 2012/0192115 A1 | 7/2012 | Falchuk et al. | |
| 2012/0306910 A1* | 12/2012 | Kim | G06F 3/04815 345/619 |
| 2013/0090101 A1* | 4/2013 | Park | G06F 3/147 455/414.3 |
| 2013/0290863 A1* | 10/2013 | Chen | G06F 3/0481 715/747 |
| 2014/0013281 A1 | 1/2014 | Bell et al. | |
| 2014/0019881 A1 | 1/2014 | Narita et al. | |
| 2014/0043321 A1* | 2/2014 | Matjasko | G06T 15/00 345/419 |
| 2014/0157128 A1 | 6/2014 | Hussain | |
| 2014/0286044 A1* | 9/2014 | Johnson | G02B 5/0278 362/607 |
| 2016/0011441 A1* | 1/2016 | Schwartz | G02F 1/1323 359/275 |

FOREIGN PATENT DOCUMENTS

| | | |
|---|---|---|
| CN | 103544199 A | 1/2014 |
| EP | 2 378 785 A2 | 10/2011 |
| KR | 1020020039928 A | 5/2002 |
| KR | 1020130051631 A | 5/2013 |
| WO | 0140917 A1 | 6/2001 |
| WO | 0159540 A2 | 8/2001 |
| WO | 2012021265 A1 | 2/2012 |
| WO | 2012082971 A1 | 6/2012 |
| WO | 2013183801 A1 | 12/2013 |

OTHER PUBLICATIONS

Search Report dated Nov. 18, 2015, issued by the International Searching Authority in counterpart International Patent Application No. PCT/KR2015/007876 (PCT/ISA/210).

Written Opinion dated Nov. 18, 2015, issued by the International Searching Authority in counterpart International Patent Application No. PCT/KR2015/007876 (PCT/ISA/237).

Communication dated Dec. 19, 2018 by the European Patent Office in counterpart European Patent Application No. 15829926.3.

Communication dated Feb. 15, 2018, from the European Patent Office in counterpart European Application No. 15829926.3.

Communication dated Jun. 27, 2019, issued by the European Patent Office in counterpart European Application No. 15829926.3.

Communication dated Aug. 2, 2019, issued by the Chinese Patent Office in counterpart Chinese Application No. 201580041851.3.

* cited by examiner

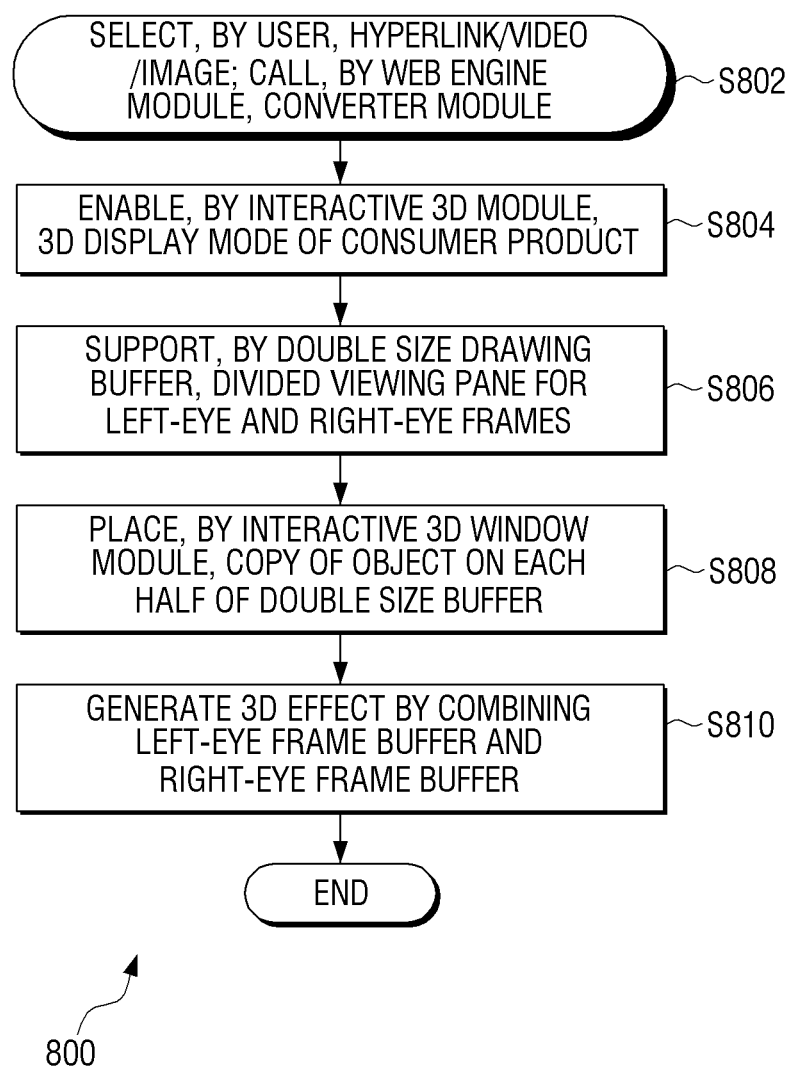

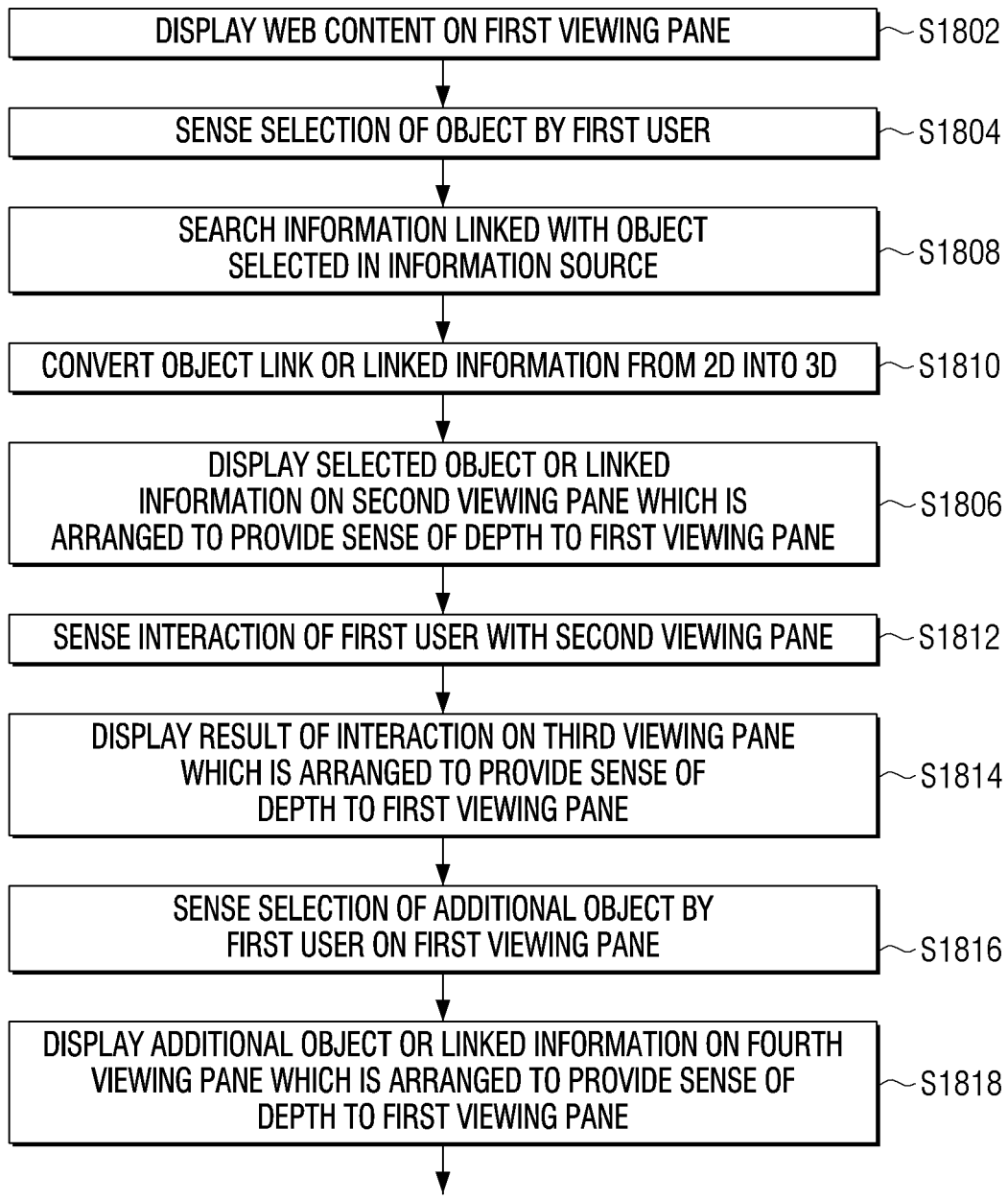

ELECTRONIC DEVICE FOR DISPLAYING OBJECT OR INFORMATION IN THREE-DIMENSIONAL (3D) FORM AND USER INTERACTION METHOD THEREOF

CROSS-REFERENCE TO RELATED APPLICATIONS

This application claims priority from a Korean patent application filed on May 21, 2015 in the Korean Intellectual Property Office and assigned Serial No. 10-2015-0070898, and an Indian Patent Application filed on Aug. 2, 2014 in the Indian Patent Office and assigned Serial No. 2198/DEL/2014, the entire disclosures of which are hereby incorporated by reference.

BACKGROUND

1. Field

Apparatuses and method consistent with exemplary embodiments relate to the field of consumer products, such as digital televisions (DTV), mobile devices, etc. and other devices where a three dimensional display may be used. Particularly, to systems and methods for user interaction with the Web in a 3D Space via the aforementioned consumer products.

2. Related Art

Currently, various 3D technologies are available to display the contents in 3D with or without the use of glasses. Most of the contents displayed in 3D are videos or graphical renderings.

However, there is a need for technologies that convert 2D objects, such as web content, to 3D content, which may be visible at different depths, in real time. There is also a need for technologies that handle multi-user scenarios where different users are browsing through different content on a single device simultaneously.

SUMMARY

One or more exemplary embodiments address the above disadvantages and other disadvantages not described above. However, it is understood that one or more exemplary embodiment are not required to overcome the disadvantages described above, and may not overcome any of the problems described above.

According to an aspect of an exemplary embodiment, there is provided an interaction method of an electronic device, including: displaying a web content comprising at least one object on a first viewing pane; sensing selection of at least one object by a first user; and displaying the selected object or information linked with the selected object on a second viewing pane in three dimensional (3D) form.

The selected object or the information linked with the selected object may be in two dimensional (2D) form. The method may further include: and converting or the information linked with the selected object from the 2D form into the 3D form; and displaying the converted object or the converted information linked with the selected objected.

The first viewing pane and the second viewing pane may be arranged to be perceived at different depths.

The interaction method may further include searching for the information linked with the selected object and retrieving the information linked with the selected objected from an information source.

The interaction method may further include: detecting a user interaction with the second viewing pane; and displaying a result of the user interaction on a third viewing pane.

The interaction method may further include: detecting a selection of an additional object by the first user on the first viewing pane; and displaying the selected additional object or information linked with the selected additional object on a fourth viewing pane in the 3D form.

In response to the electronic device being in a multi-user mode, the viewing pane corresponding to the first user may be viewable only by the first user.

The interaction method may further include: detecting a selection of an object by a second user on the first viewing pane; and displaying the object selected by the second user or information linked with the object selected by the second user on a fifth viewing pane in the 3D form.

In response to a mode of the electronic device being a sharing mode, an interaction between the viewing pane corresponding to the first user and the viewing pane corresponding to the second user may be enabled.

The object may be one from among an image, video, text, hyperlink, attached file, and multimedia.

According to an aspect of an exemplary embodiment, there is provided an electronic device, including: a display configured to display web content comprising at least one object on a first viewing pane; a sensor configured to detect a selection of at least one object by a first user; and a processor configured to, in response to the selection of at least one object being detected by the sensor, control the display to display the selected object or information linked with the selected object on a second viewing pane in three dimensional (3D) form.

The selected object or the information linked with the selected object may be in two dimensional (2D) form. The processor may control to convert the selected object or the information linked with the selected object from the 2D form into the 3D form. The converted object or the converted information linked with the selected objected.

The processor is further configured to control the display to arrange the first viewing pane and the second viewing pane to be perceived at different depths.

The processor may be further configured to search for the information linked with the selected object and retrieve the information linked with the selected objected from an information source.

The processor may control the sensor to detect a user interaction with the second viewing pane, and control the display to display a result of the user interaction on a third viewing pane.

The processor may control the sensor to detect a selection of an additional object by the first user on the first viewing pane, and controls the display to display the selected additional object or information linked with the selected additional object on a fourth viewing pane in the 3D form.

In response to the electronic device being in a multi-user mode, the processor may control the display to display the viewing pane corresponding to the first user to be viewable only by the first user.

The processor may control the sensor to detect a selection of an object by a second user on the first viewing pane, and controls the display to display the object selected by the second user or information linked with the object selected by the second user on a fifth viewing pane in the 3D form.

The processor may control the sensor to detect a selection of an additional object by the first user on the first viewing pane, and controls the display to display the selected additional object or information linked with the selected additional object on a fourth viewing pane in the 3D form.

In response to the electronic device being in a multi-user mode, the processor may control the display to display the viewing pane corresponding to the first user to be viewable only by the first user.

In response to the mode of the electronic device being converted into a sharing mode, an interaction between the viewing pane corresponding to the first user and the viewing pane corresponding to the second user may be enabled.

The object may be one from among an image, video, text, hyperlink, attached file, and multimedia.

According to an aspect of an exemplary embodiment, an interaction method of an electronic device, includes: displaying content comprising at least one two dimensional (2D) object on a first viewing pane displayed; detecting a selection of the at least one 2D object; converting the 2D object into a three dimensional (3D) object; and displaying the 3D object at a different depth than the first viewing pane.

The 3D object may be displayed in a second view pane.

The method may further include detecting a user interaction with the second viewing pane; and displaying a result of the user interaction on a third viewing pane displayed.

The third viewing pane may be displayed at a different depth than the second viewing pane.

The method may further include searching for the information linked with the selected object and retrieving the information linked with the selected objected from an information source.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like elements.

FIG. 8 is a flowchart of a method for arranging the first viewing pane and the second viewing pane at different depths;

FIGS. 18A and 18B illustrates a flowchart of a method of interaction in accordance with another exemplary embodiment, wherein displaying the selected object or information linked to the selected object in three-dimensional is an optional choice;

DETAILED DESCRIPTION

Figure 1:
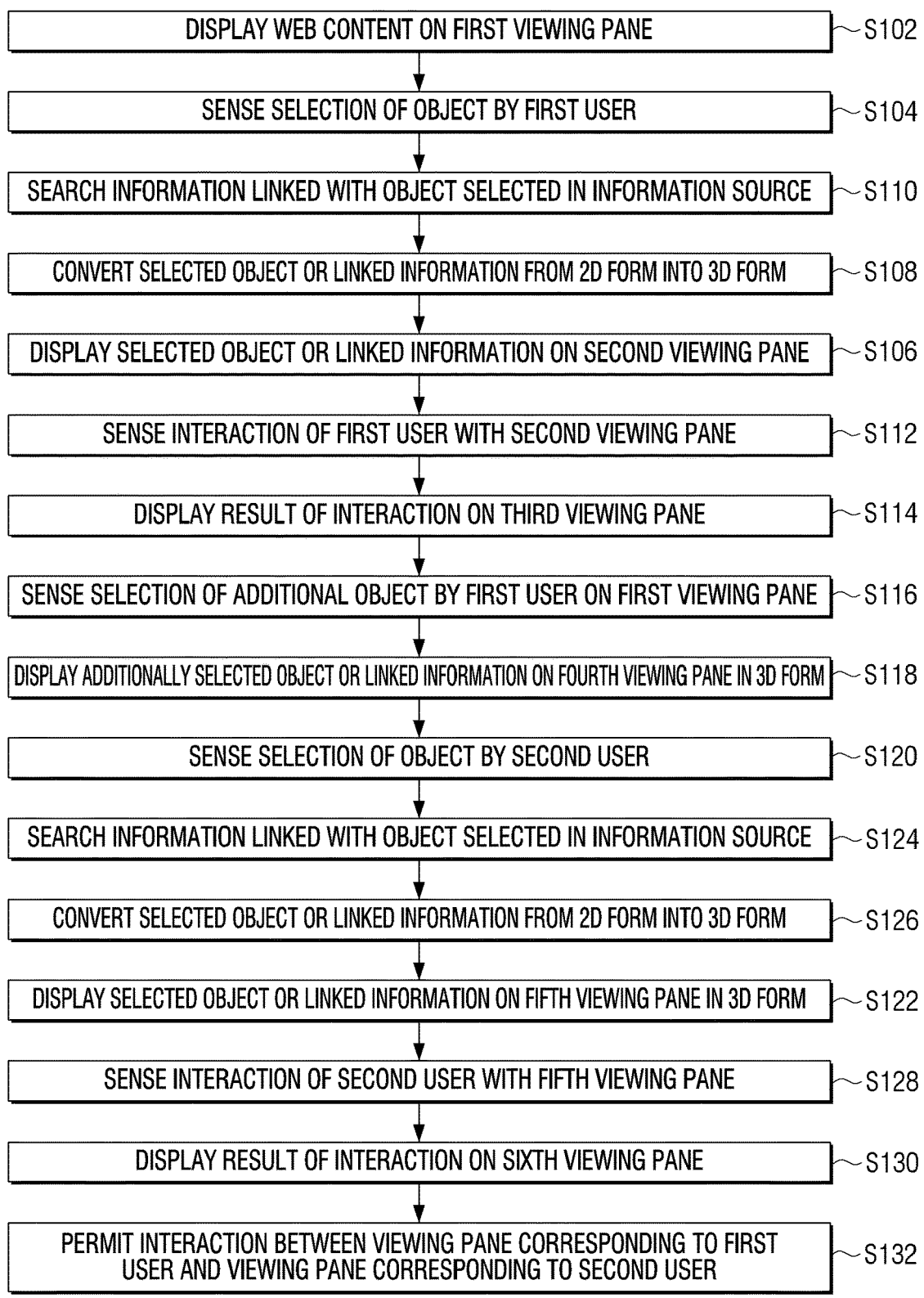
FIG. 1 illustrates a method of interaction in accordance with an exemplary embodiment.

It should be understood at the outset that although an illustrative implementation of one exemplary embodiment of the present disclosure is illustrated below, the present system may be implemented using any number of techniques. The present disclosure should in no way be limited to the illustrative implementations, drawings, and techniques illustrated below, including the exemplary design and implementation illustrated and described herein, but may be modified within the scope of the appended claims along with their full scope of equivalents.

Handheld electronic devices such as mobile telephones, personal digital assistants, handheld computers, and similar devices will be referred to herein as handsets. Desktop, laptop computers, personal computers, and similar devices will be referred to herein as computing devices. Digital television (DTV), projectors, and similar devices will be referred to herein as display devices. Handsets and display device will be referred to as consumer products. Thus, exemplary embodiments can be implemented in any consumer product which incorporates three dimensional (3D) technologies (with or without glasses), to display the contents in 3D form.

The term web-content as used in the specification and the claims is intended to include among others, web sites, documents, data, applications, e-services, images, audio and video files, personal Web pages, e-mails, archived e-mail messages, blogs, discussion boards, etc. The term web-content is also intended to include images, text, multimedia files, hyperlinks, (to text, images, multimedia contents and documents), widgets (like drop down list, input text box, etc.), attachments (to text, images, multimedia contents and documents) and any other web standard content.

The term "object" is intended to include among others an image, a text, a video, a hyperlink, an attachment, a multimedia file, etc.

The terms "first," "second," etc. may be used to describe diverse components, but the components are not limited by the terms. The terms are only used to distinguish one component from the others.

The terminology and structure employed herein is for describing, teaching and illustrating exemplary embodiments and their specific features and elements and do not limit, restrict or reduce the spirit and scope of the claims or their equivalents.

Unless otherwise defined, all terms, and any technical and/or scientific terms, used herein may be taken to have the same meaning as commonly understood by one having an ordinary skill in the art.

Reference is made herein to "exemplary embodiments." It should be understood that an exemplary embodiment is an example of a possible implementation of any features and/or elements presented in the attached claims. Some exemplary embodiments have been described for the purpose of illustrating one or more of the potential ways in which the specific features and/or elements of the attached claims fulfill the requirements of uniqueness, utility and non-obviousness.

Unless otherwise specified, one or more particular features and/or elements described in connection with one or more exemplary embodiments may be found in one exemplary embodiment, or may be found in more than one exemplary embodiment, or may be found in all exemplary embodiments, or may not be found in any exemplary embodiments.

Referring to FIG. 1, an interaction method 100 includes: displaying web content including at least one object on a first viewing pane (operation S102); sensing a selection of at least one object by a first user (operation S104); and displaying the selected object or information linked with the selected object on a second viewing pane in 3D form (operation S106).

According to an exemplary embodiment, the first viewing pane and the second viewing pane are arranged in order to form a depth. In particular, the first viewing pane and the second viewing pane may be arranged so that the user of a display device perceives the different depths of the first viewing pane and the second viewing pane.

According to another exemplary embodiment, the interaction method 100 may further include converting the selected object or the information linked with the selected object from a 2D form into a 3D form (operation S108).

The interaction method 100 may further include searching for the information linked with the selected object and retrieving the information from an information source (operation S110).

Further, the interaction method 100 may include sensing interaction of the first user with the second viewing pane (operation S112), and displaying a result of the interaction (operation S114).

According to another exemplary embodiment, the result of the interaction may be displayed on a third viewing pane.

In addition, the third viewing pane may be arranged in order to be perceived at a different a depth with respect to the second viewing pane. In particular, the third viewing pane and the second viewing pane may be arranged so that the user of a display device perceives the different depths of the third viewing pane and the second viewing pane.

According to another exemplary embodiment, the interaction method 100 may further include sensing a selection of an object by a second user from the first viewing pane (operation S120), and displaying the selected object or information linked with the selected object on a fifth viewing pane on a fifth viewing pane in a 3D form (operation S122).

In addition, the interaction method 100 may further include searching for the information linked with the object selected by the second user and retrieving the information from an information source (operation S124).

Further, the interaction method 100 may include converting the object selected by the second user or the information linked with the object selected by the second user from a 2D form into a 3D form (operation S126).

Further still, the first viewing pane and the fifth viewing pane may be arranged in order to form a depth.

According to another exemplary embodiment, the interaction method 100 may include sensing an additional interaction of the second user with the fifth viewing pane (operation S128), and displaying a result of the interaction (operation S130).

In addition, the result of the interaction of the second user with the fifth viewing pane may be displayed on a sixth viewing pane.

Further, the sixth viewing pane may be arranged in order to be perceived at a different depth with respect to the fifth viewing pane. In particular, the sixth viewing pane and the fifth viewing pane may be arranged so that the user of a display device perceives the different depths of the fifth viewing pane and the sixth viewing pane.

The interaction method 100 may further include enabling interaction between the viewing pane corresponding to the first user and the viewing pane corresponding to the second user (operation S132).

The object may be selected from a group including an image, video, text, hyperlink, reference document, and multimedia.

Figure 2:
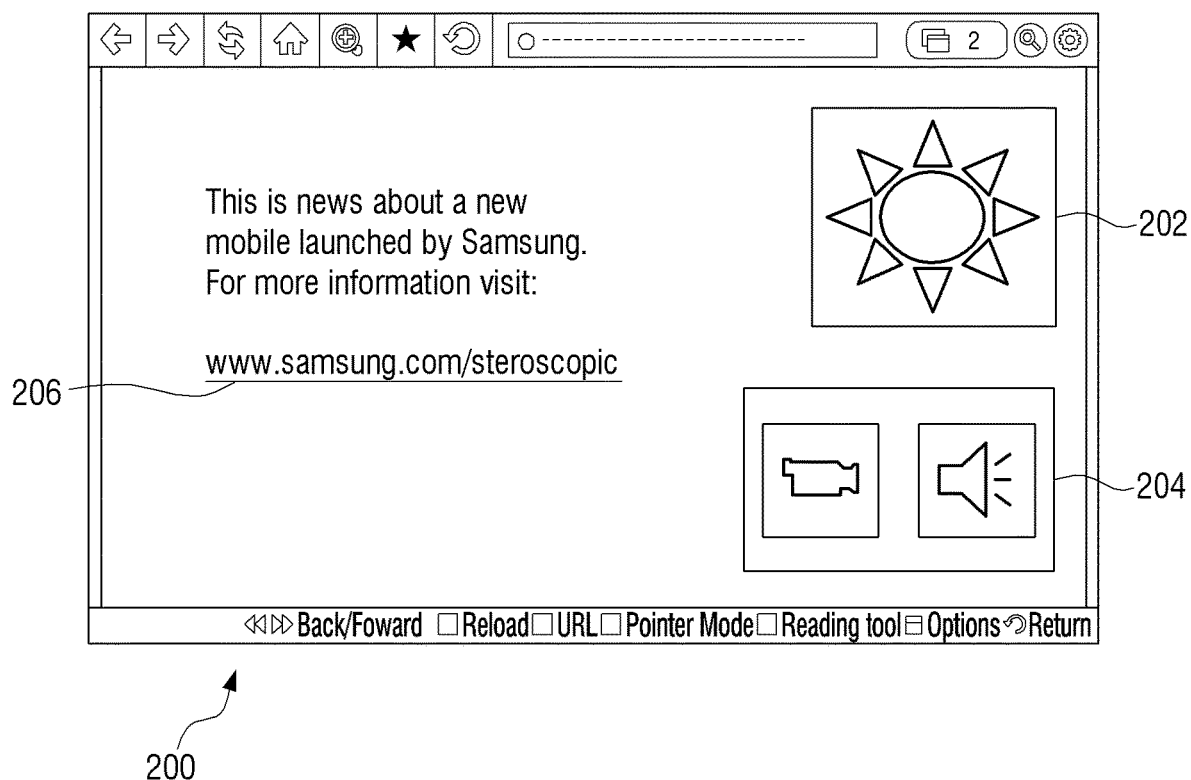
FIG. 2 illustrates a first viewing pane displaying a web page having at least one object.

As described above, the interaction method includes the displaying the web content on the first viewing pane (operation S102). Referring to FIG. 2, a first viewing pane 200 displaying a web page is illustrated. The web page may include at least one object. As shown in FIG. 2, the web page may include three objects 202, 204, 206. The objects may be an image 202, a video 204, and a hyperlink 206.

Figure 3:
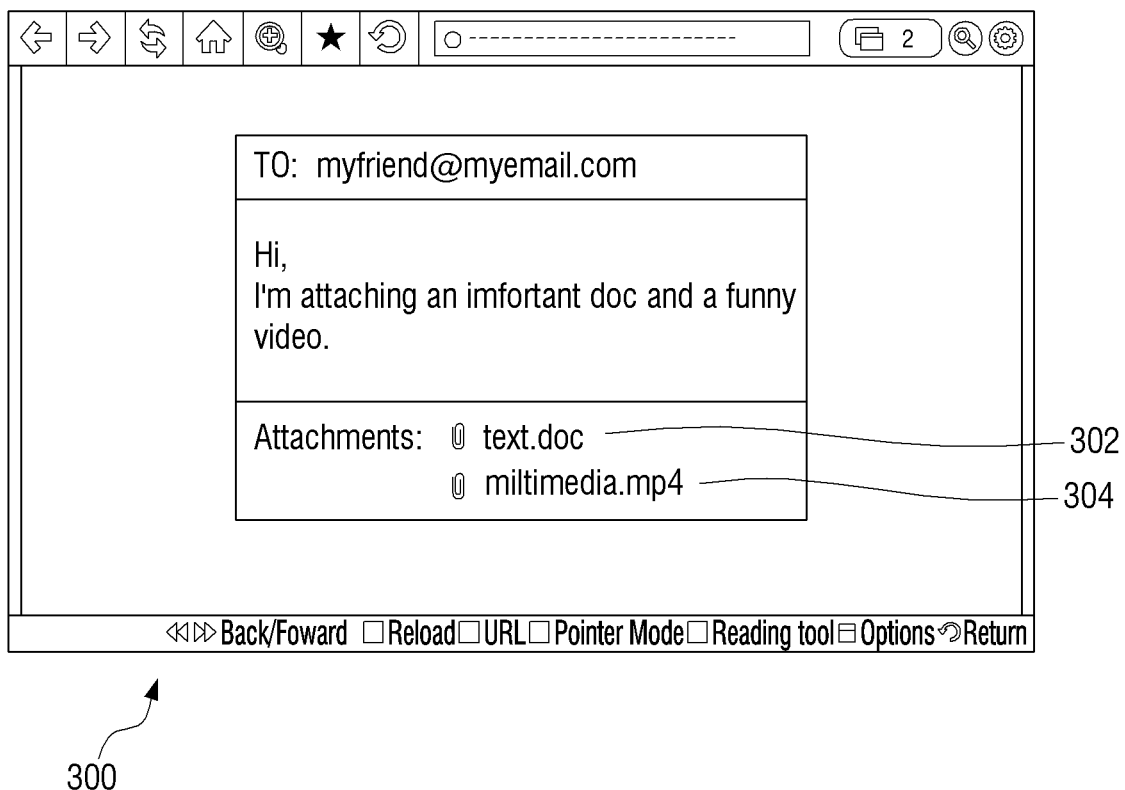
FIG. 3 illustrates a first viewing pane displaying an e-mail having at least one object.

Referring to FIG. 3, a first viewing pane 300 displaying an email is illustrated. In this case, an attached file of the email may be treated as an object. For example, the email displayed on the first viewing pane 300 includes a first attached file titled "text.doc" 302 and multimedia 304. The "text.doc" 302 and the multimedia 304 may be treated as objects. It should be noted that the first viewing pane 300 may be displayed as a different type of web content. In addition, the web content may include different types of objects from those illustrated FIG. 2 or 3.

Figure 4:
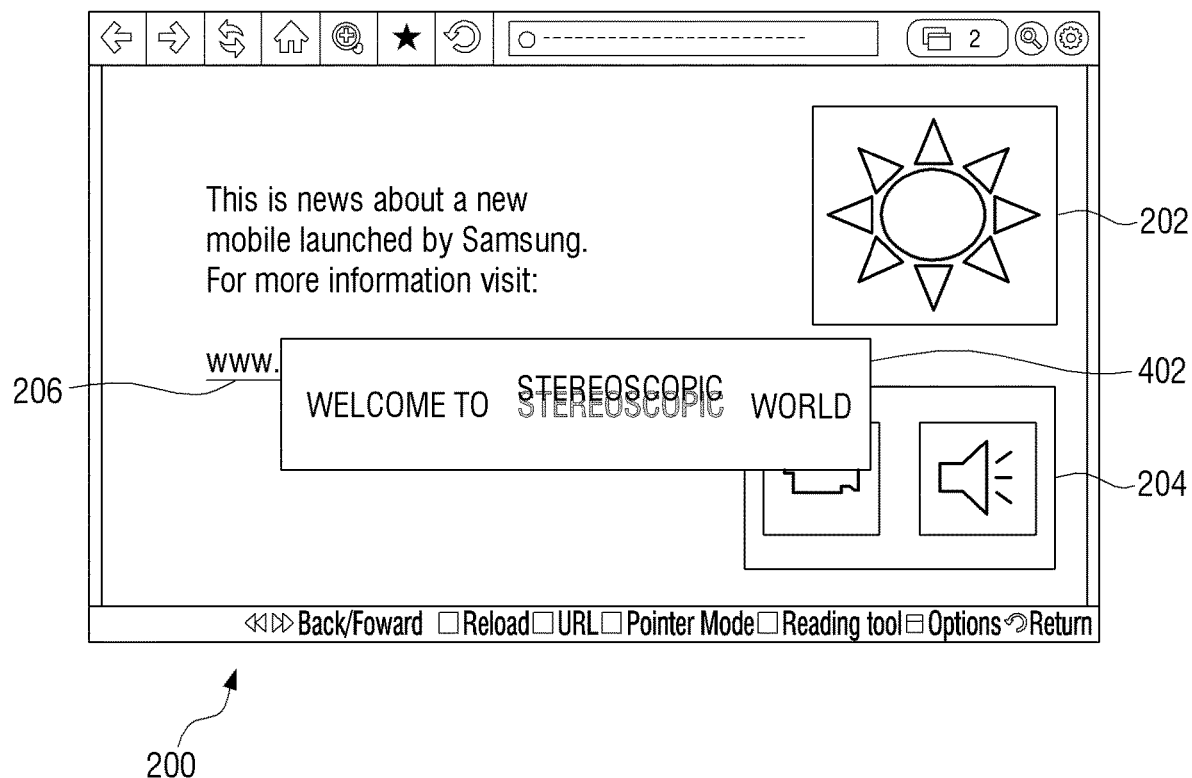
FIG. 4 illustrates a second viewing pane displaying a selected object in three-dimensional form.

The interaction method 100 includes the sensing the selection of at least one object by the first user (operation S104). The user selection may be received from any one of a mouse, a keypad, a remote controller, a voice command, a touch, and an air gesture. When the first viewing pane displays the web page shown in FIG. 2 and the selection of the object 206 (that is, hyperlink) by the user is sensed, the result of the selection is displayed on the second viewing pane in the 3D form (operation S106). The display of the second viewing pane may be the selected object or information linked with the selected object. When the object 206 is linked with the text "WELCOME TO STEREOSCOPIC WORLD," the second viewing pane 402 displays the text in the 3D form as shown in FIG. 4. In this case, the word "stereoscopic" is placed closer to the first user when compared to the other words. A different 3D form may be applied.

Figure 5:
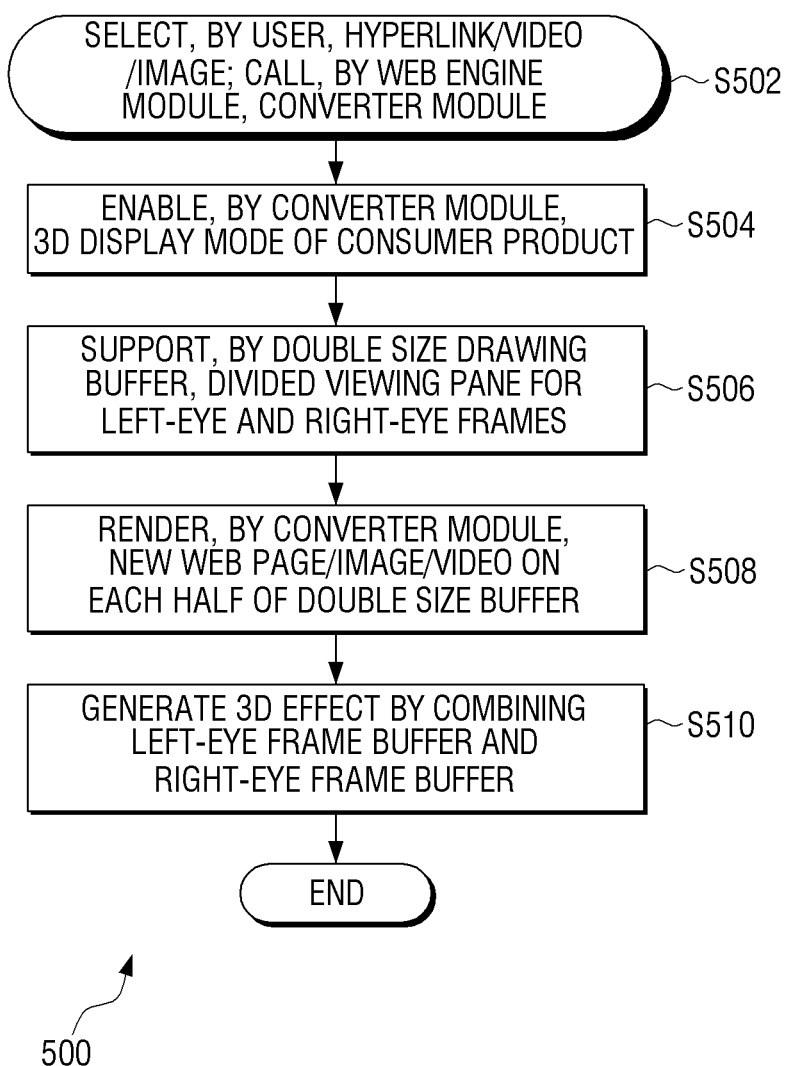
FIG. 5 is flowchart of a process for converting an object from two dimensional form to three-dimensional form.

When the selected object or the information linked with the selected object is in the 2D form, the interaction method 100 may further include converting the selected object or the information linked with the selected object from the 2D form into the 3D form (operation S108). Referring to FIG. 5, a process 500 of converting from a 2D form into a 3D form according to an exemplary embodiment includes calling a converter module by a web engine, following the sensing the selection of the object on the web content (operation S502).

As a result, the converter module enables a 3D display of a consumer product or display device (operation S504). The converter module generates a drawing buffer of a double the size (a left-eye frame buffer and a right-eye frame buffer) in order to support a drawing divided for a left-eye frame and a right-eye frame (operation S506). A copy of a new web page/image/video (that is, an object) is rendered on each half of the double size buffer (operation S508). After that, the converter module combines the left-eye frame buffer and the right-eye frame buffer to create a 3D effect (operation S510). However, another processor which is usable to convert may exist in addition to the processor for converting from the 2D form into the 3D form shown in FIG. 5.

Figure 6:
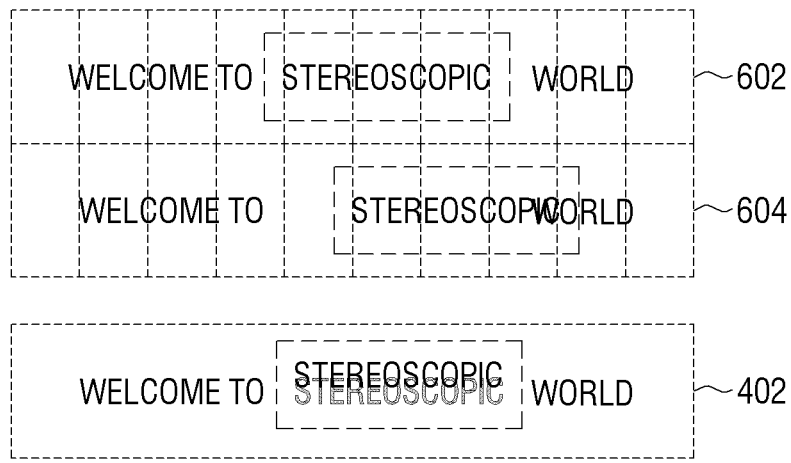
FIG. 6 illustrates a drawing buffer comprising right eye image, a drawing buffer comprising a left eye image and the second viewing pane displaying the selected object in three-dimensional form.

Referring to FIG. 6, positioning 602 of the right-eye image of the drawing buffer performed by the converter module, and positioning 604 of the left-eye image of the drawing buffer performed by the converter module are moved as illustrated by reference numeral 604 to reach the second viewing pane which displays the above text in the 3D form (402).

Figure 7:
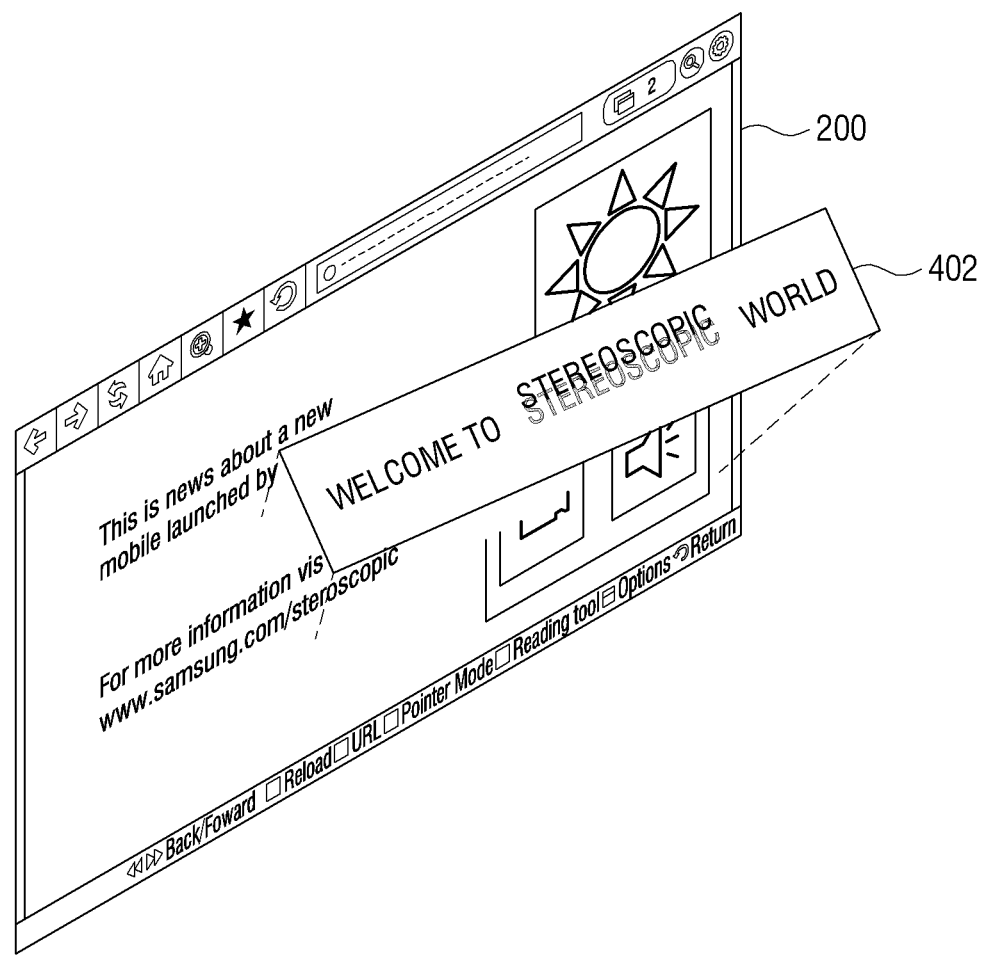
FIG. 7 illustrates arrangement of the first viewing pane and the second viewing pane defining a depth.

According to an exemplary embodiment, the first viewing pane 200 and the second viewing pane 402 may be arranged to represent a depth. As shown in FIG. 7, the second viewing pane 402 is displayed closer to the user compared to the first viewing pane 200. The second viewing pane 420 is also displayed in the 3D form in addition to the content displayed on the second viewing pane 402 in the 3D form.

In order to arrange the first viewing pane 200 and the second viewing pane 402 to form the depth, the interaction method may be performed as shown in FIG. 8. The interaction method 800 includes calling an interactive 3D window by a web engine, following the sensing the selection of the object on the web content (operation S802).

As a result, the interactive 3D module enables a 3D display mode of a consumer product or display device (operation S804). The interactive 3D module generates a double size drawing buffer in order to support a drawing divided for a left-eye frame and a right-eye frame (operation S806). A copy of a new web page/image/video (that is, an object) may be rendered on each half of the double size buffer (operation S808). The left-eye frame buffer and the right-eye frame buffer may be combined with each other to create a 3D depth effect (operation S810). However, another process for arranging the first viewing pane 200 and the second viewing pane 402 to represent the depth may be applied, and the present disclosure is not limited to the process shown in FIG. 8.

Figure 9A:
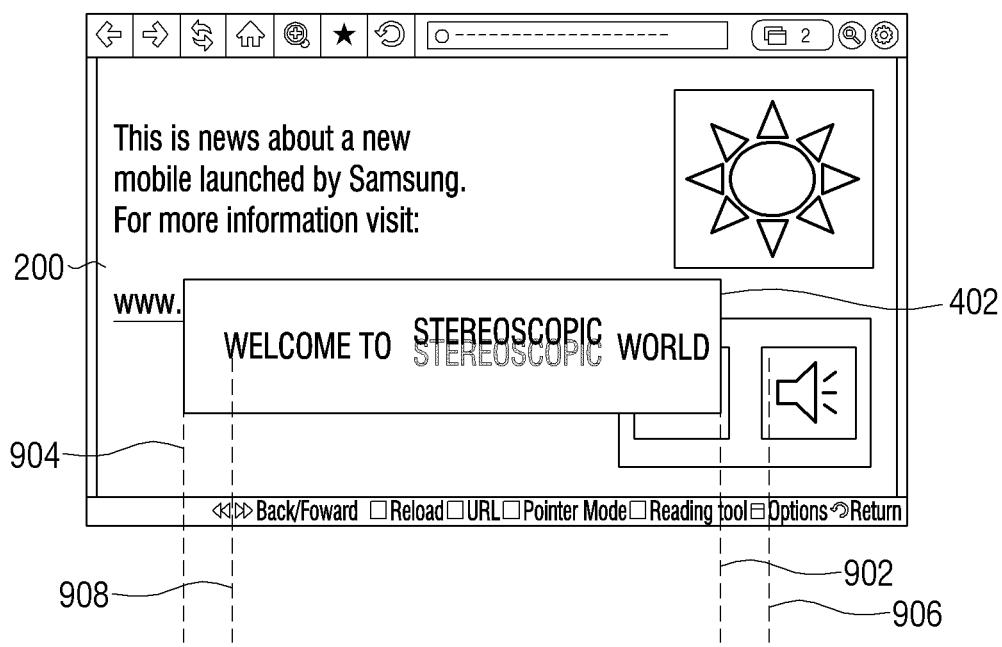
FIG. 9A illustrates a drawing buffer comprising right eye image.
Figure 9B:
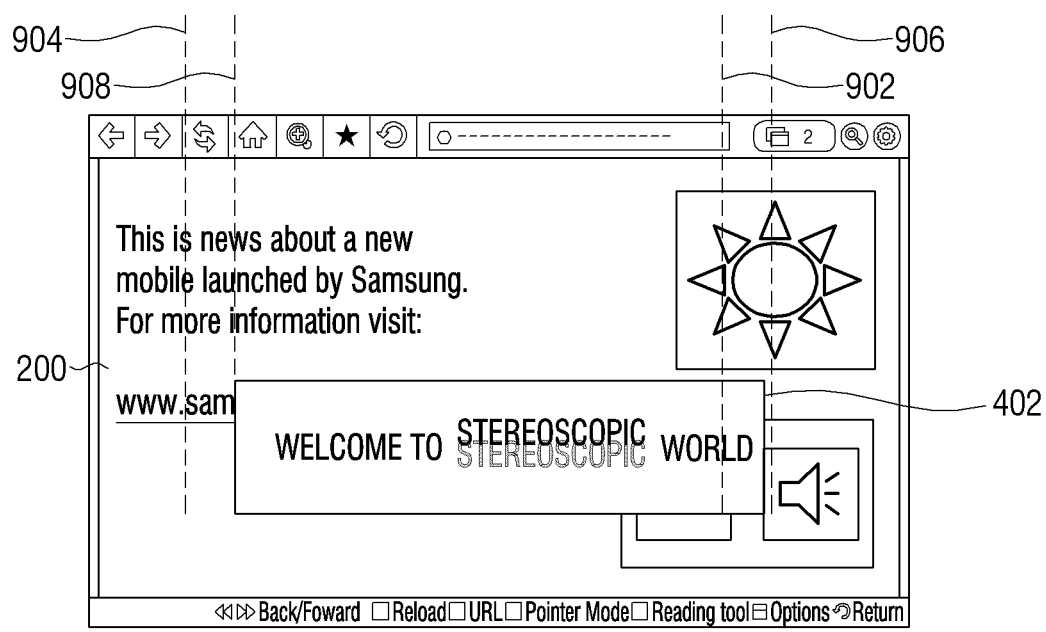
FIG. 9B illustrates a drawing buffer comprising a left eye image.
Figure 9C:
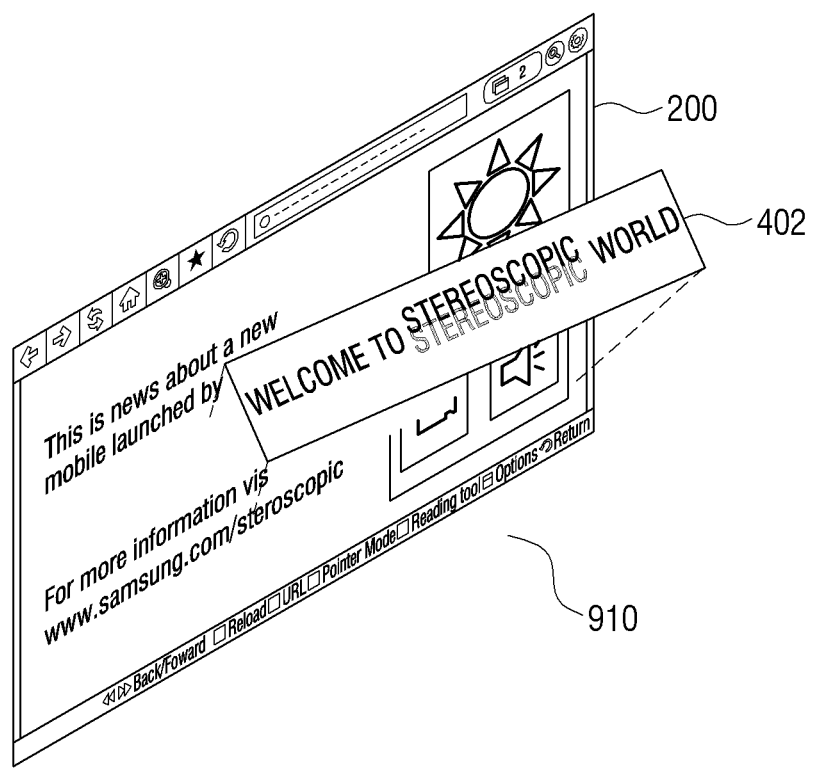
FIG. 9C illustrates the second viewing pane displaying the selected object in three-dimensional form.

Referring to FIGS. 9A-9C, positioning 902 of the right-eye image of the drawing buffer and positioning 904 of the left-eye image of the drawing are moved as illustrated by reference numerals 906 and 908 to reach a final display as shown by reference numeral 910. The first viewing pane 200 and the second viewing pane 402 are arranged as indicated by reference numeral 910 to form the depth.

As described above, the interaction method 100 may further include the sensing the interaction of the first user with the second viewing pane (operation S112), and displaying the result of the interaction (operation S114). The result of the interaction may be displayed on the third viewing pane, and the third viewing pane may be arranged to be perceived at a different depth with respect to the second viewing pane. The process may be repeated for the third viewing pane.

Figure 10A:
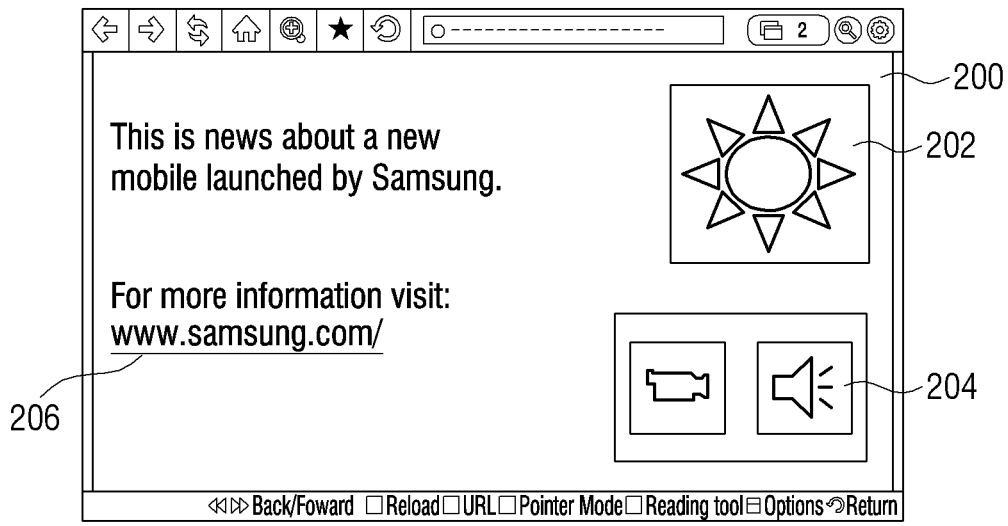
FIG. 10A represents the first viewing pane comprising plurality of objects.
Figure 10B:
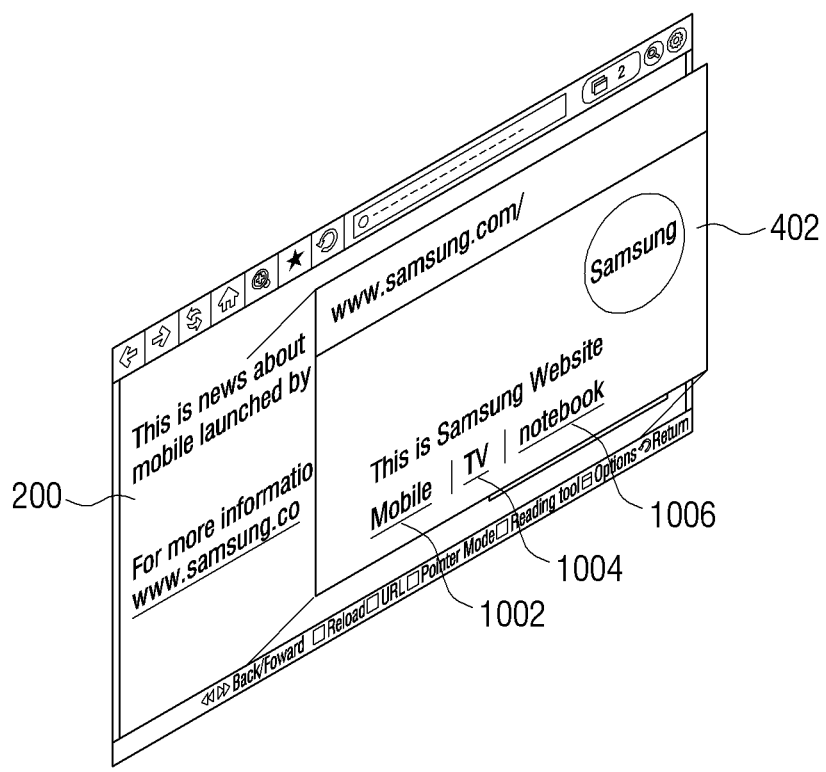
FIG. 10B illustrates display of the second viewing pane comprising information linked to an object selected from the first viewing pane.
Figure 10C:
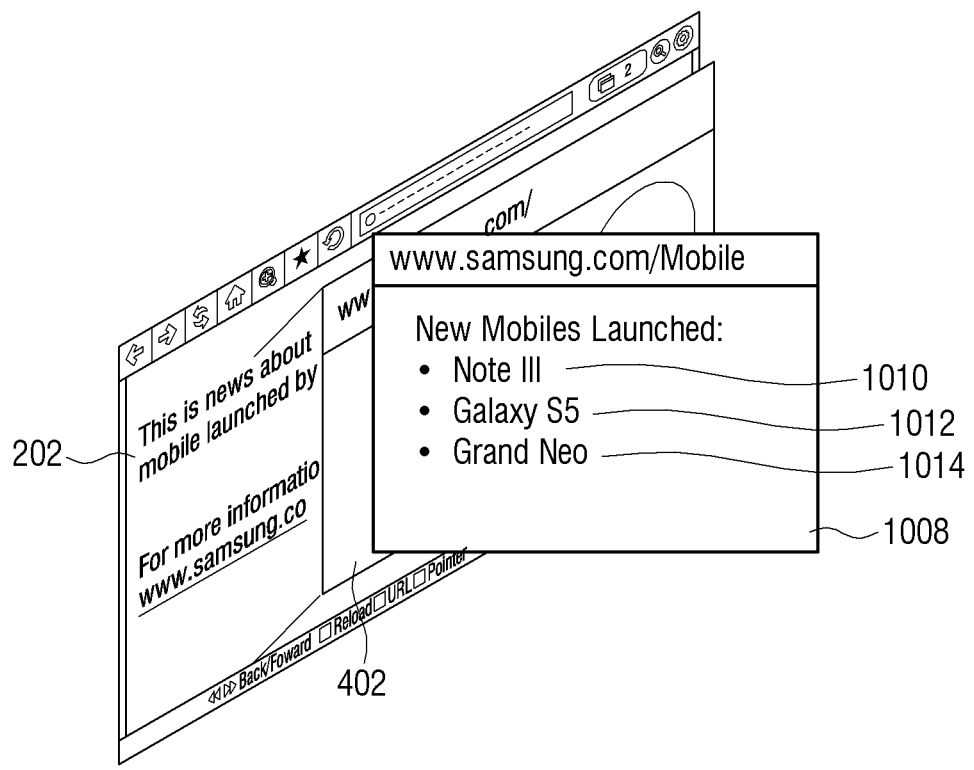
FIG. 10C illustrates display of a third viewing pane comprising information linked to an object selected from the second viewing pane.
Figure 10D:
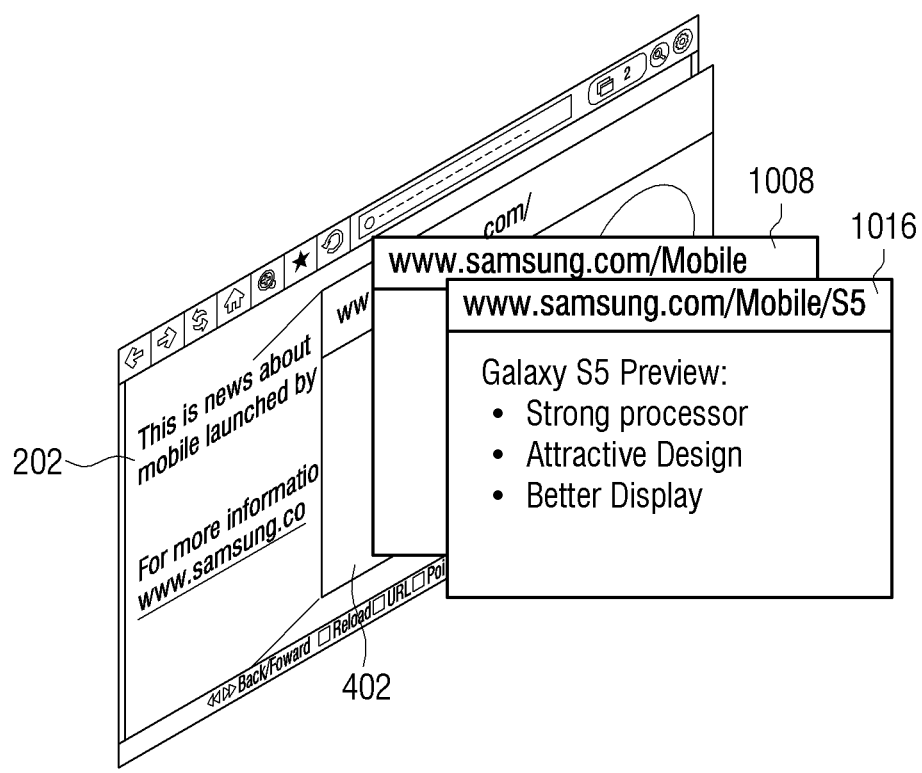
FIG. 10D illustrates display of a further viewing pane comprising information linked to an object selected from the third viewing pane.

According to an exemplary embodiment as shown in FIGS. 10A to 10D, FIG. 10A illustrates a first viewing pane including a plurality of objects 202, 204, and 206. In response to the user selecting the object 206, the information linked with the selected object 206 is displayed on a second viewing pane 402 as shown in FIG. 10B. The second viewing pane includes objects 1002, 1004, 1006. In response to the first user selecting the object 1002, the information linked with the selected object 1002 is displayed on a third viewing pane 1008 as shown in FIG. 10C. As shown in FIG. 10C, the third viewing pane 1008 is arranged to be perceived at a different depth with respect to the second viewing pane 402, e.g. at third depth different from a depth of the first viewing pane and the second viewing pane. The above-described process may further be repeated. In particular, when the third viewing pane 1008 includes at least one object, the result of selecting the object of the third viewing pane 1008 may be displayed on an additional viewing pane. FIG. 10C illustrates the third viewing pane 1008 including three objects 1010, 1012, and 1014. In response to the user selecting the object 1012, the information linked with the selected object 1012 is displayed on an additional viewing pane 1016 as shown in FIG. 10D.

In some examples, the user interaction with the second viewing pane may be displayed on the second viewing pane rather than on the opening of the third viewing pane. For example, when the second viewing pane displays an image or text and the interaction is to increase the size of the image or text displayed, the result of the interaction may be displayed on the second viewing pane rather than on the opening of the third viewing pane.

In addition, when the second viewing pane displays an image and the interaction is to rotate the displayed image, the result of the interaction may be displayed on the second viewing pane rather than on the opening of the third viewing pane.

Further, when the second viewing pane displays a video and the interaction is one of replay and stop, the result of the interaction may be displayed on the second viewing pane rather than on the opening of the third viewing pane. Therefore, the displaying the result of the interaction on the additional window may include displaying the result on the same viewing pane.

Further still, the interaction method 100 may further include the sensing the selection of the additional object by the first user on the first viewing pane 202 (operation S116), and displaying the selected object and the information linked with the selected object on the fourth viewing pane in the 3D form (operation S118). These operations are illustrated in FIGS. 11A to 11C.

Figure 11A:
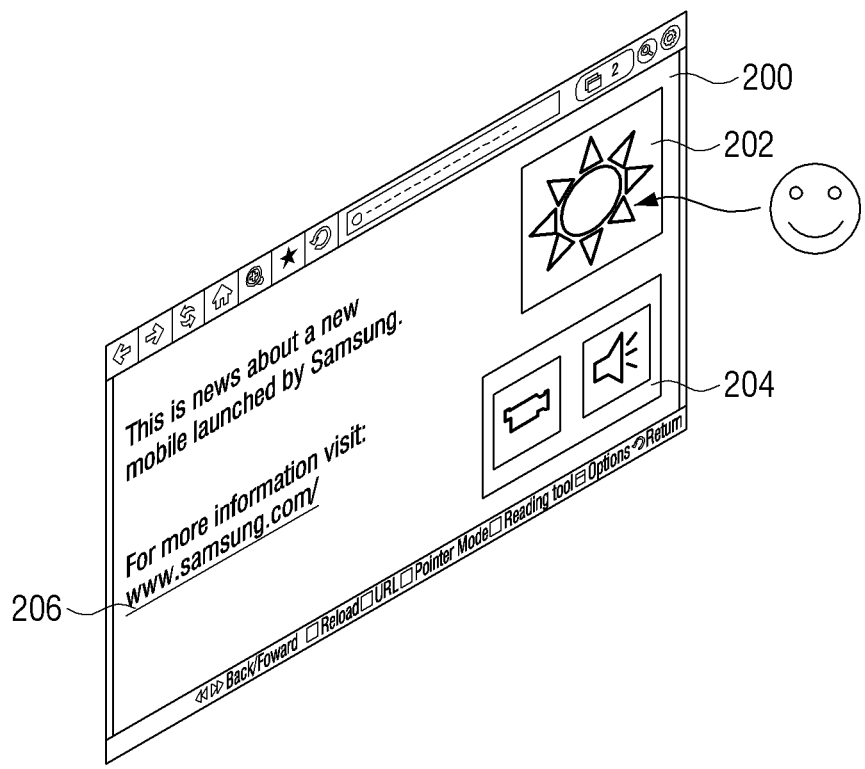
FIG. 11A illustrates display of a first viewing pane to the first user.
Figure 11B:
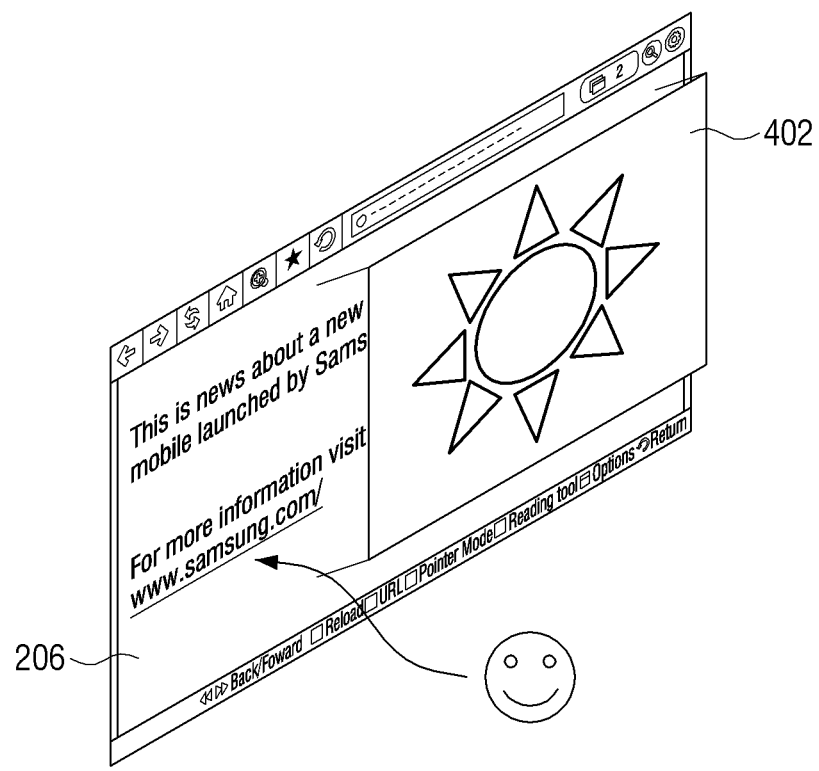
FIG. 11B illustrates display of a second viewing pane comprising information linked to an object selected from the first viewing pane to the first user.
Figure 11C:
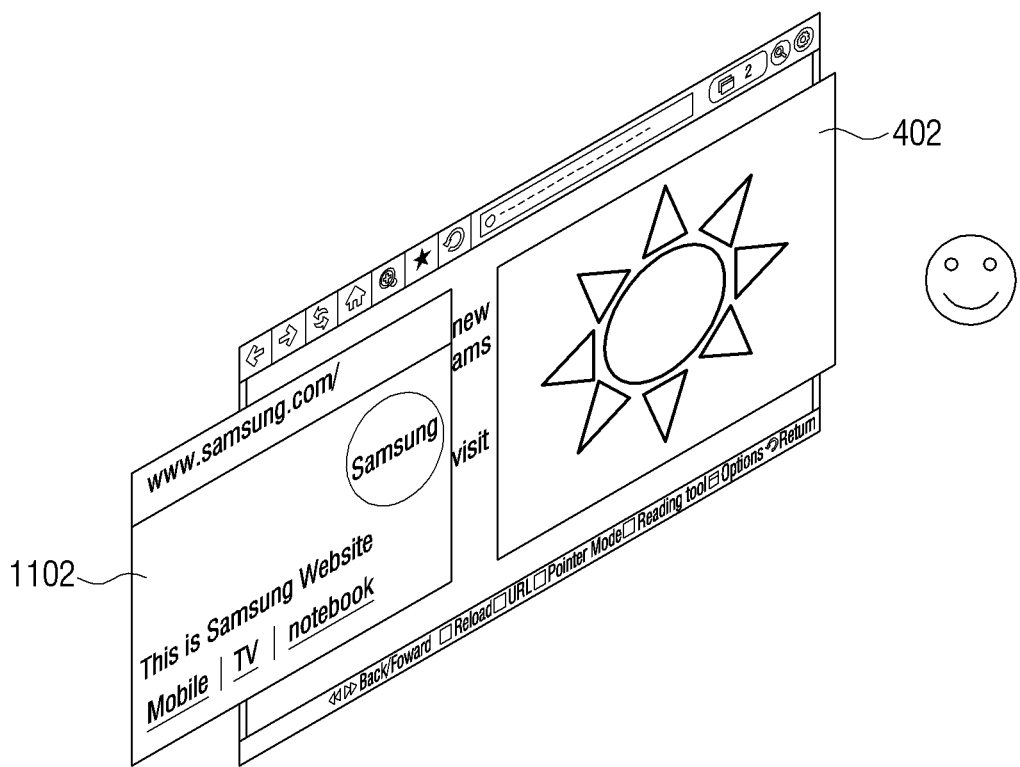
FIG. 11C illustrates display of a fourth viewing pane comprising information linked to an object selected from the first viewing pane to the first user.

Referring to FIG. 11A, the first viewing pane 200 is displayed for the first user. In response to selection of the object 202 on the first viewing pane 200 being sensed, the second viewing pane 402 including the selected object or the information linked with the selected object is displayed for the user as shown in FIG. 11B.

At this time, the interaction method 100 may include further selecting, by the first user, one of the first viewing pane 200 and the second viewing pane 402. In response to the first user selecting an additional object on the first viewing pane 200, the interaction method 100 may sense the additional selection. In response to selection of the object 206 being sensed, the interaction method 100 may display the selected object or information linked with the selected object on the fourth viewing pane 1102 as shown in FIG. 11C.

Figure 12A:
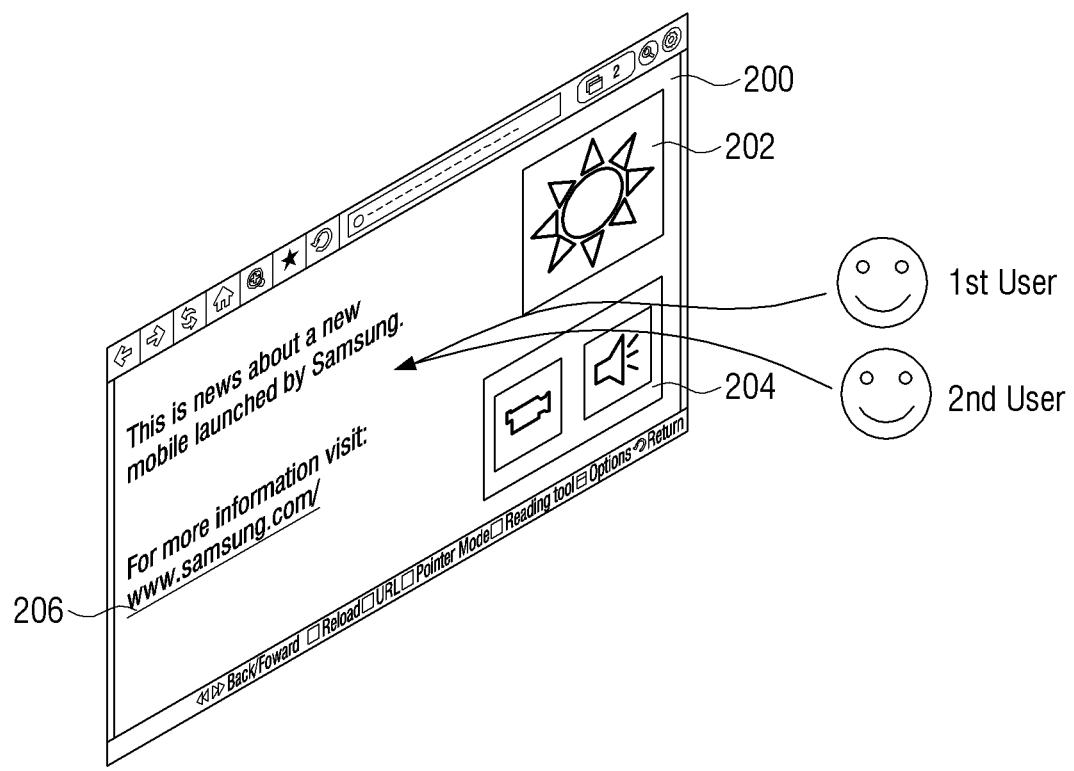
FIG. 12A illustrates display of a first viewing pane to a first user and a second user.

In addition, in the case of a plurality of user consumer products (that is, consumer products which are controlled by a plurality of users independently and display images in the 3D form), the interaction method may include displaying a web content on the first viewing pane 200 in order for the first user and the second user view it as shown in FIG. 12A.

Figure 12B:
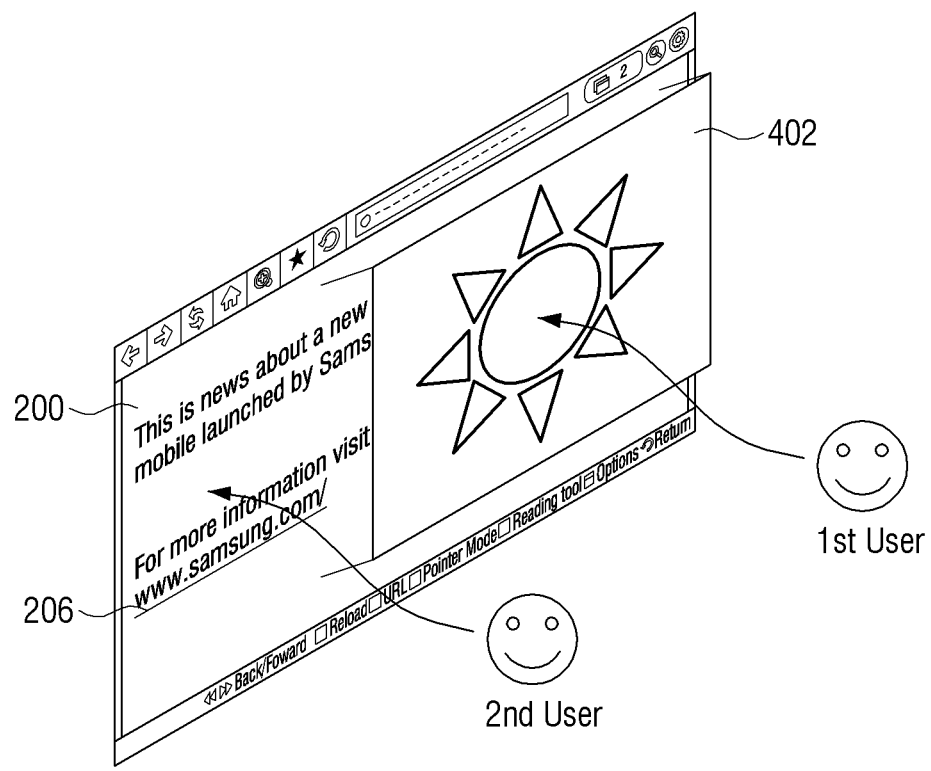
FIG. 12B illustrates display of a second viewing pane viewable only by the first user and comprising information linked to an object selected by the first user from the first viewing pane.

When the first user selects an object on the first viewing pane 200 and the multi-user mode is in an on-state, and the selected object or information linked with the selected object is displayed on the second viewing pane 402, the second viewing pane 402 may be viewed only by the first user as shown in FIG. 12B. The second user may continue viewing the first viewing pane 200 without any interference by the second viewing pane 402. The content of the second viewing pane 402 (viewed by the first user) may be in the 3D form. Furthermore, the second viewing pane 402 may appear closer to the first user compared to the first viewing pane 200.

In addition, the interaction method 100 may further include the sensing the selection of the object by the second user on the first viewing pane (operation S120), and the displaying of the selected object and the information linked with the selected object on the fifth viewing pane in the 3D form (operation S122).

Figure 13A:
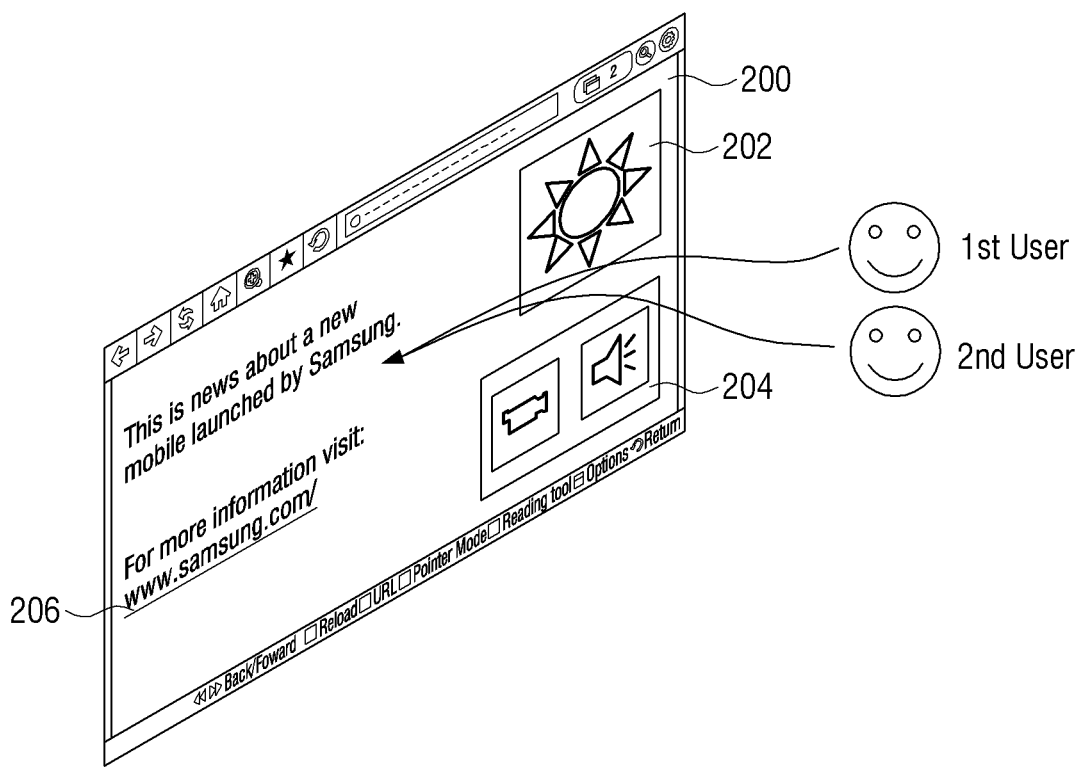
FIG. 13A illustrates display of a first viewing pane to a first and a second user.

As shown in FIG. 13A, the interaction method 100 may include displaying web content on the first viewing pane 200 in order for the first user and the second user to view it.

Figure 13B:
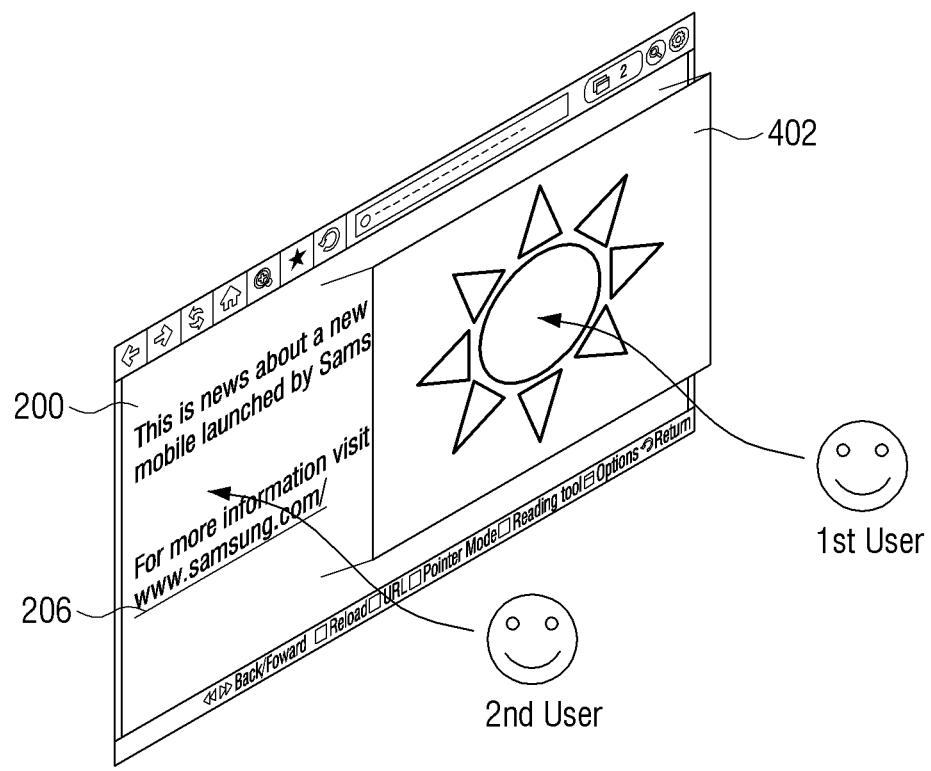
FIG. 13B illustrates display of a second viewing pane viewable only by the first user and comprising information linked to an object selected by the first user from the first viewing pane.

When the first user selects an object on the first viewing pane 200 and the multi-user mode is in the on-state, and the selected object or the information linked with the selected object is displayed on the second viewing pane 402, the second viewing pane 402 may be viewed only by the first user as shown in FIG. 13B. The second user may continue viewing the first viewing pane 200 without any interference by the second viewing pane 402. For The content of the second viewing pane 402 may be in the 3D form. Furthermore, the second viewing pane 402 may appear closer to the first user compared to the first viewing pane 200.

Figure 13C:
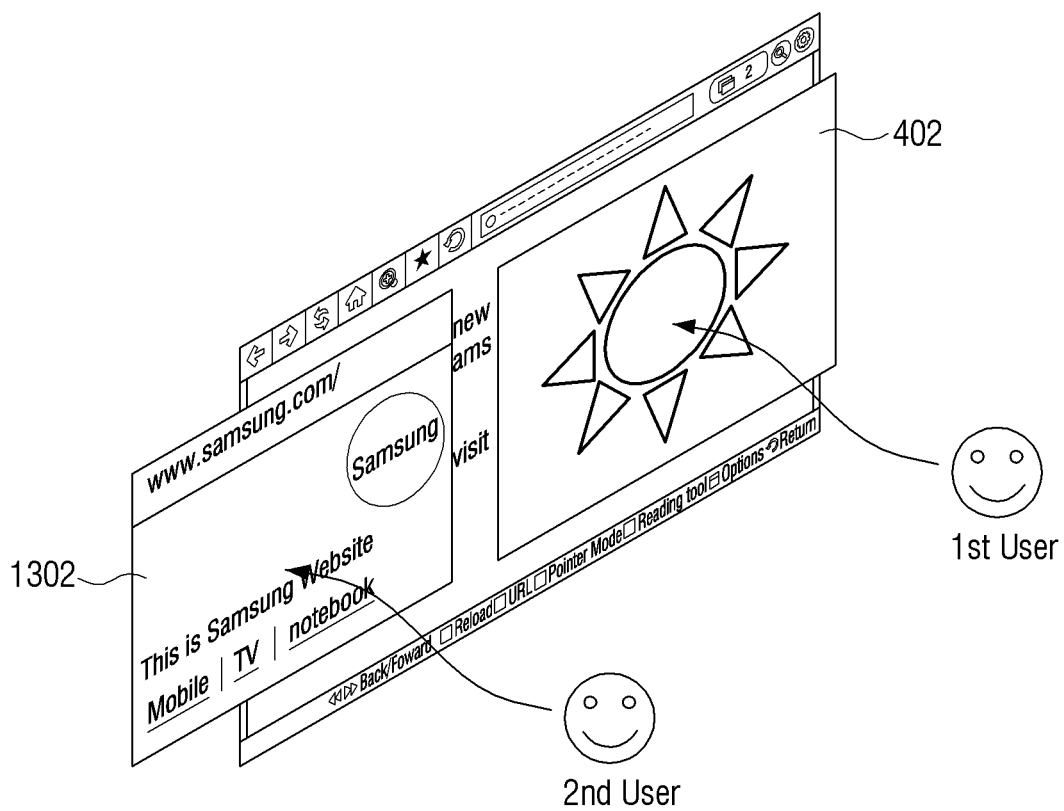
FIG. 13C illustrates display of a fifth viewing pane viewable only by the second user and comprising information linked to an object selected by the second user from the first viewing pane.

In response to the second user selecting an object on the first viewing pane 200, a fifth viewing pane 1302 to be viewed only by a second user may be opened as shown in FIG. 13C. The first user may continue viewing the second viewing pane 402 without any interference by the fifth viewing pane 1302. The first viewing pane 200 may be viewed as a background to both the first user and the second user. The content of the second viewing pane 402 (viewed by the first user) and the content of the fifth viewing pane 1302 (viewed by the second user) may be in the 3D form. Furthermore, the second viewing pane 402 may appear closer to the first user compared to the first viewing pane 200. The fifth viewing pane 1302 may appear closer to the second user compared to the first viewing pane 200.

In addition, the interaction method 100 may further include sensing the additional interaction with the fifth viewing pane 1302 (operation S128), and displaying the result of the sensed interaction (operation S130). These operations may be performed as shown in FIGS. 14A to 14D.

Figure 14A:
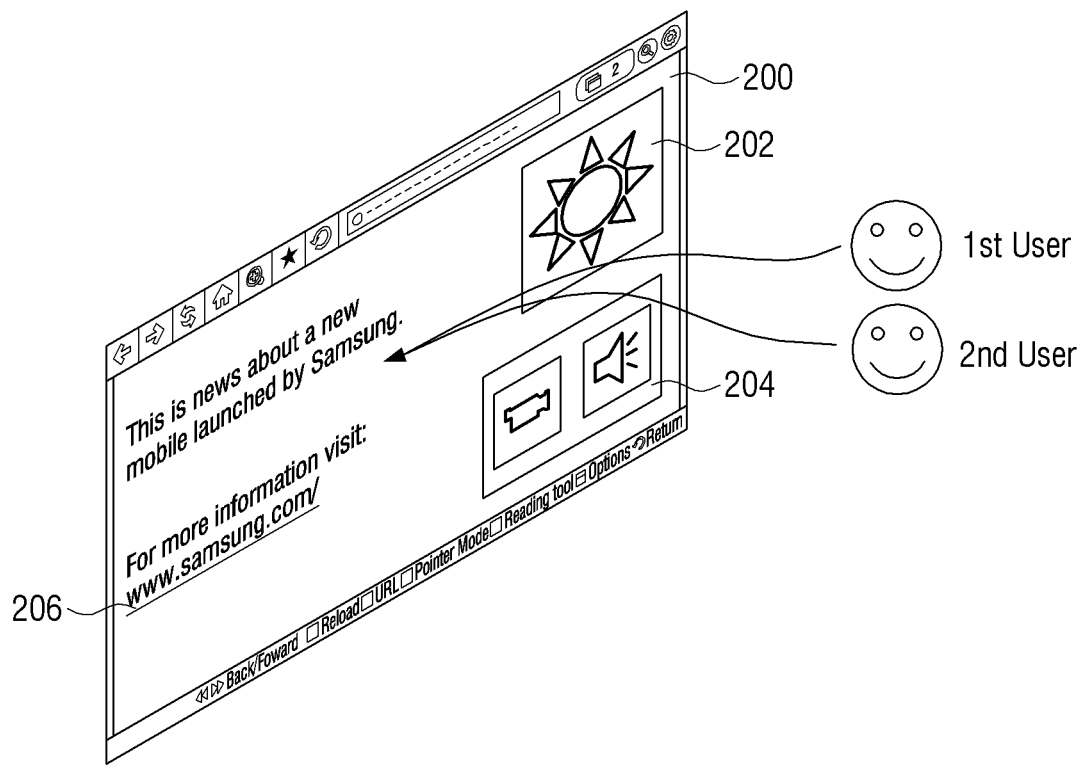
FIG. 14A illustrates display of a first viewing pane to a first and a second user.
Figure 14B:
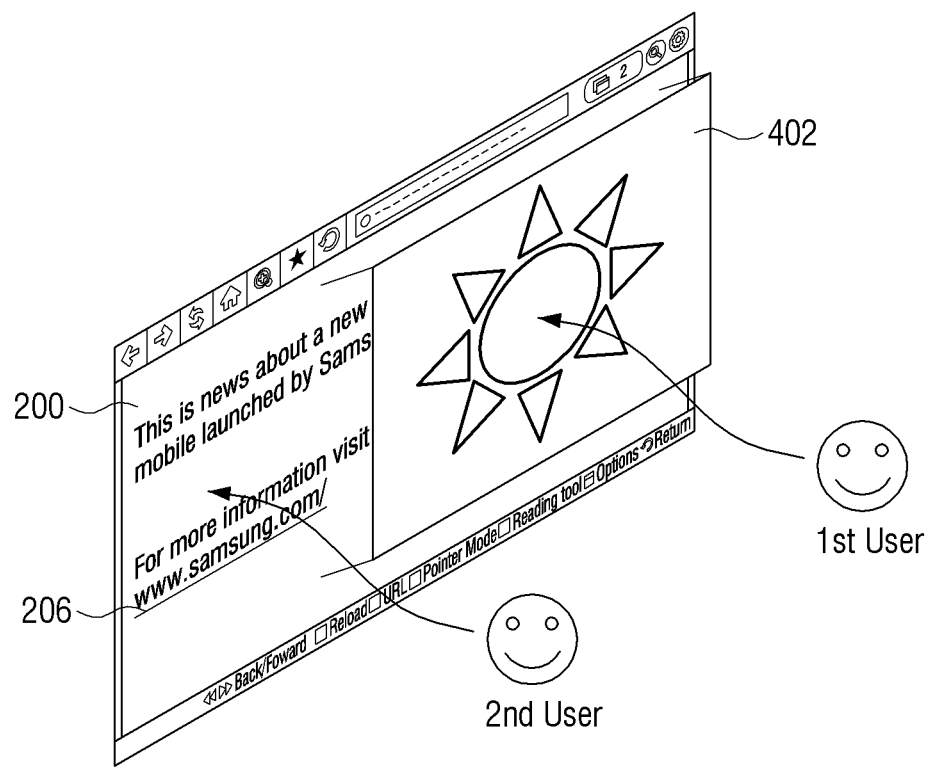
FIG. 14B illustrates display of a second viewing pane viewable only by the first user and comprising information linked to an object selected by the first user from the first viewing pane.
Figure 14C:
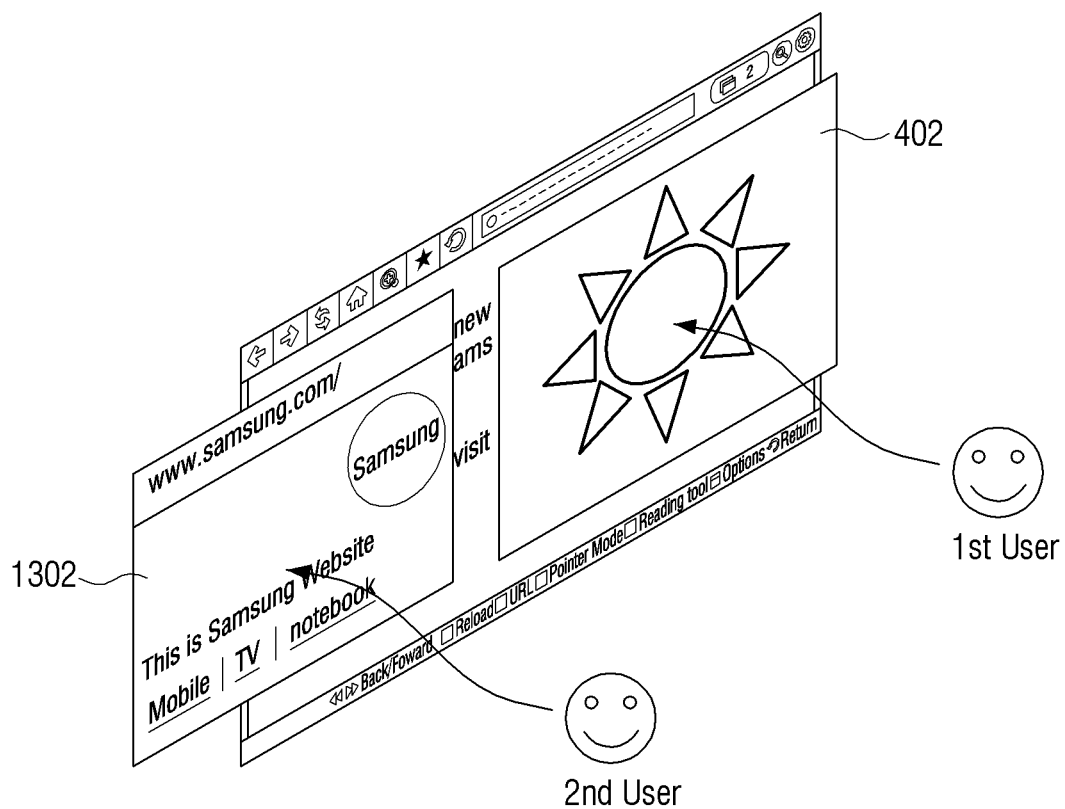
FIG. 14C illustrates display of a fifth viewing pane viewable only by the second user and comprising information linked to an object selected by the second user from the first viewing pane.

Herein, FIGS. 14A to 14C are similar to FIGS. 13A to 13C.

Figure 14D:
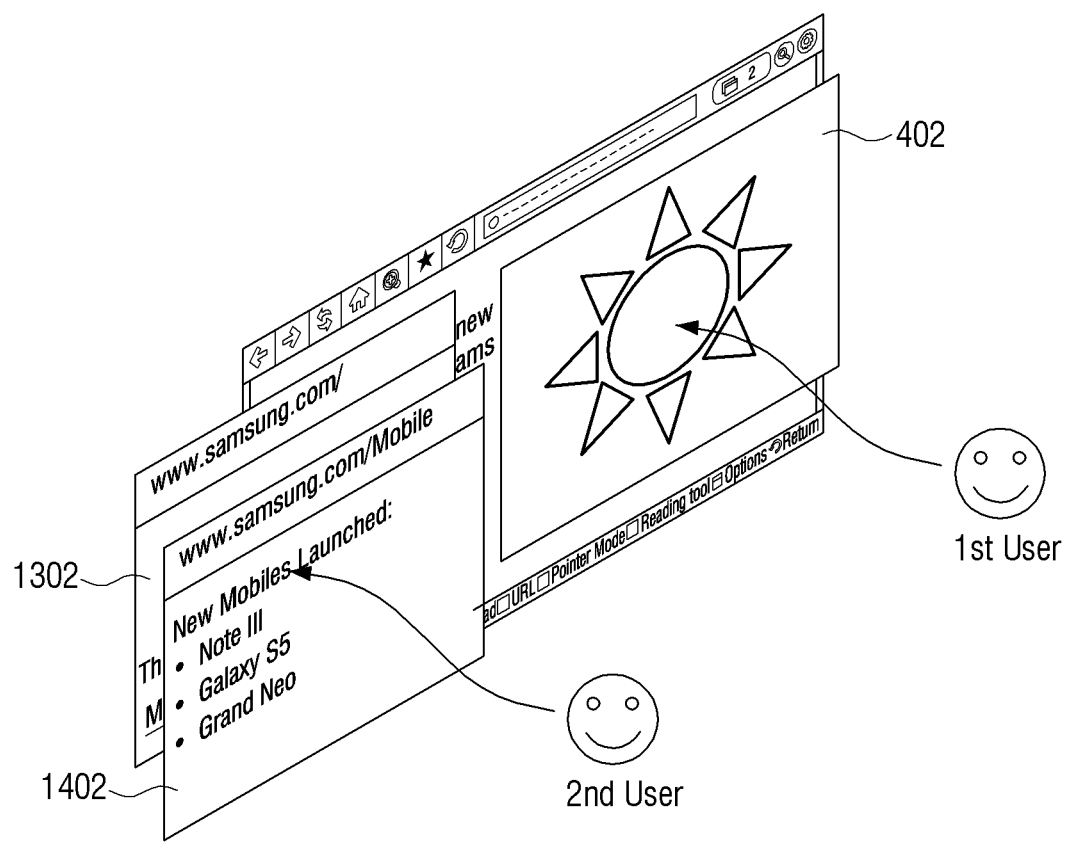
FIG. 14D illustrates display of a sixth viewing pane viewable only by the second user and comprising information linked to an object selected by the second user from the fifth viewing pane.

FIG. 14D will be explained. In response to the second user selecting an object displayed on the fifth viewing pane 1302, the selection of the object by the second user is sensed and the selected object or the information linked with the selected object is displayed on a sixth viewing pane 1402. According to an exemplary embodiment, the sixth viewing pane 1402 may be arranged to be perceived at a different depth with respect to the fifth viewing pane 1302.

In addition, the interaction method 100 may further include permitting interaction between the viewing pane corresponding to the first user and the viewing pane corresponding to the second user (operation S132). This operation is illustrated in FIGS. 15A to 15E.

Herein, FIGS. 15A to 15D are similar to FIGS. 14A to 14D.

Figure 15A:
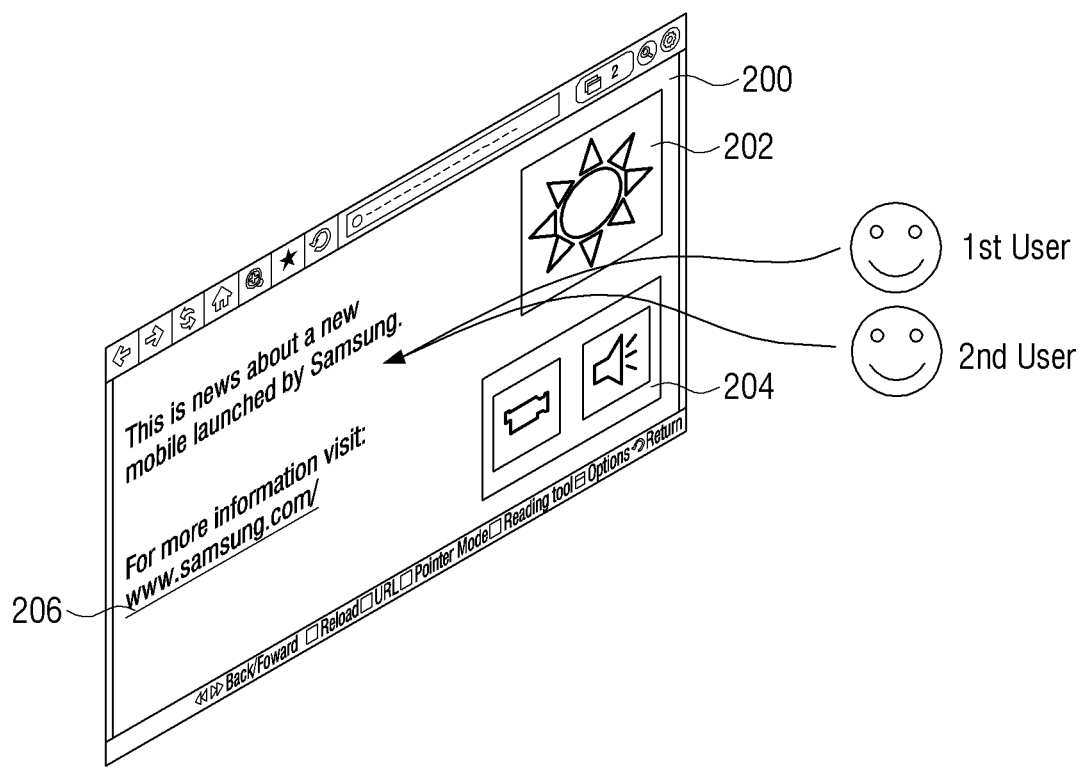
FIG. 15A illustrates display of a first viewing pane to a first and a second user.
Figure 15B:
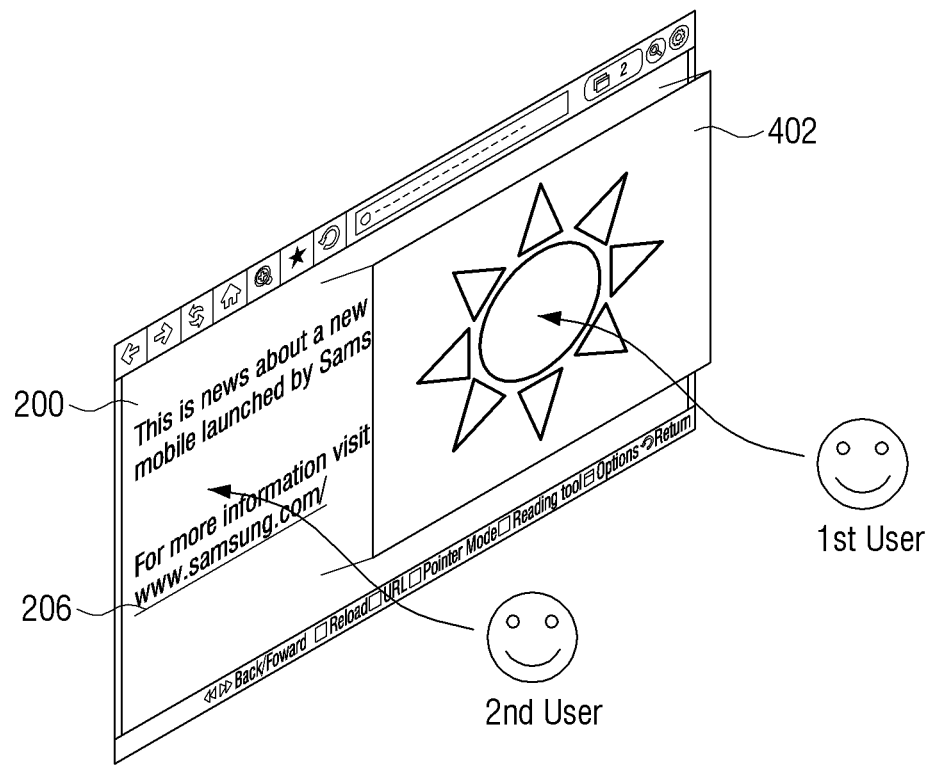
FIG. 15B illustrates display of a second viewing pane viewable only by the first user and comprising information linked to an object selected by the first user from the first viewing pane.
Figure 15C:
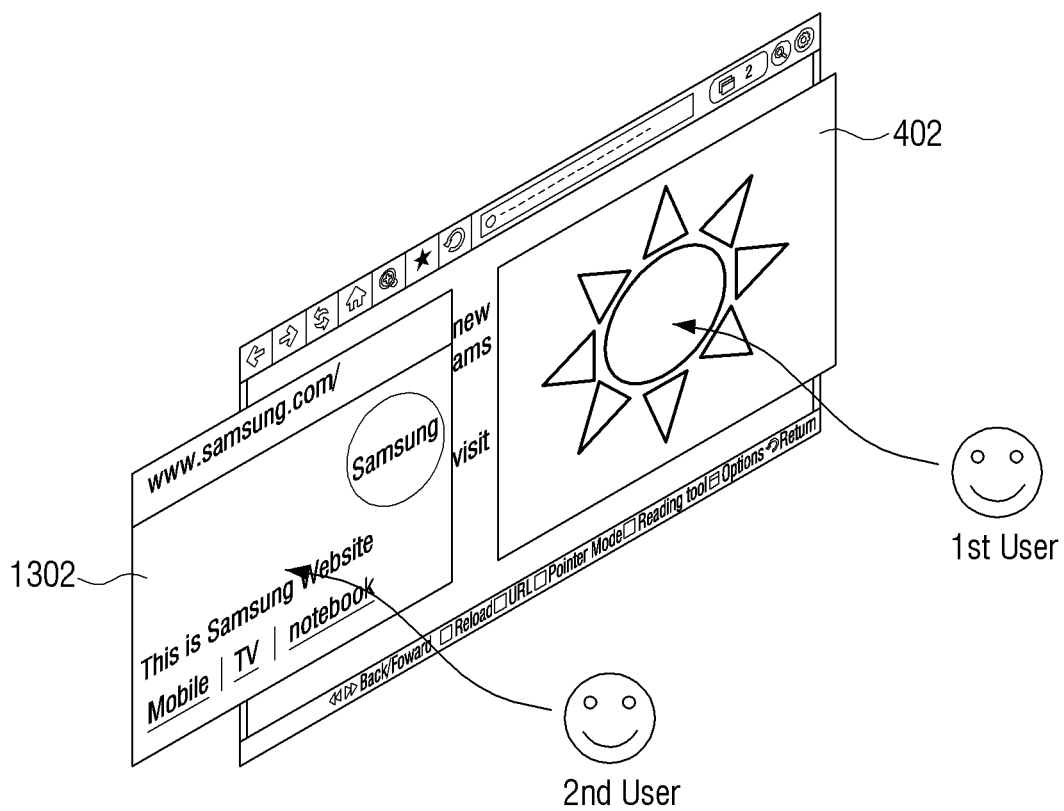
FIG. 15C illustrates display of a fifth viewing pane viewable only by the second user and comprising information linked to an object selected by the second user from the first viewing pane.
Figure 15D:
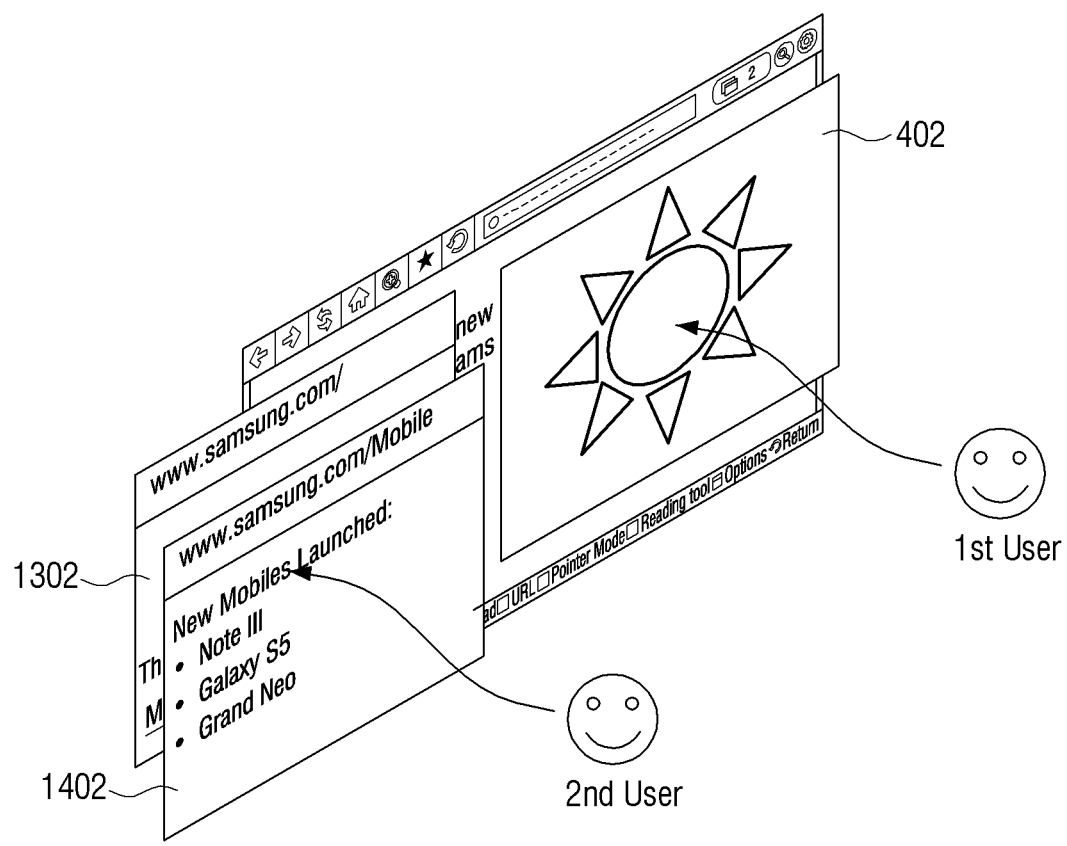
FIG. 15D illustrates display of a sixth viewing pane viewable only by the second user and comprising information linked to an object selected by the second user from the fifth viewing pane.
Figure 15E:
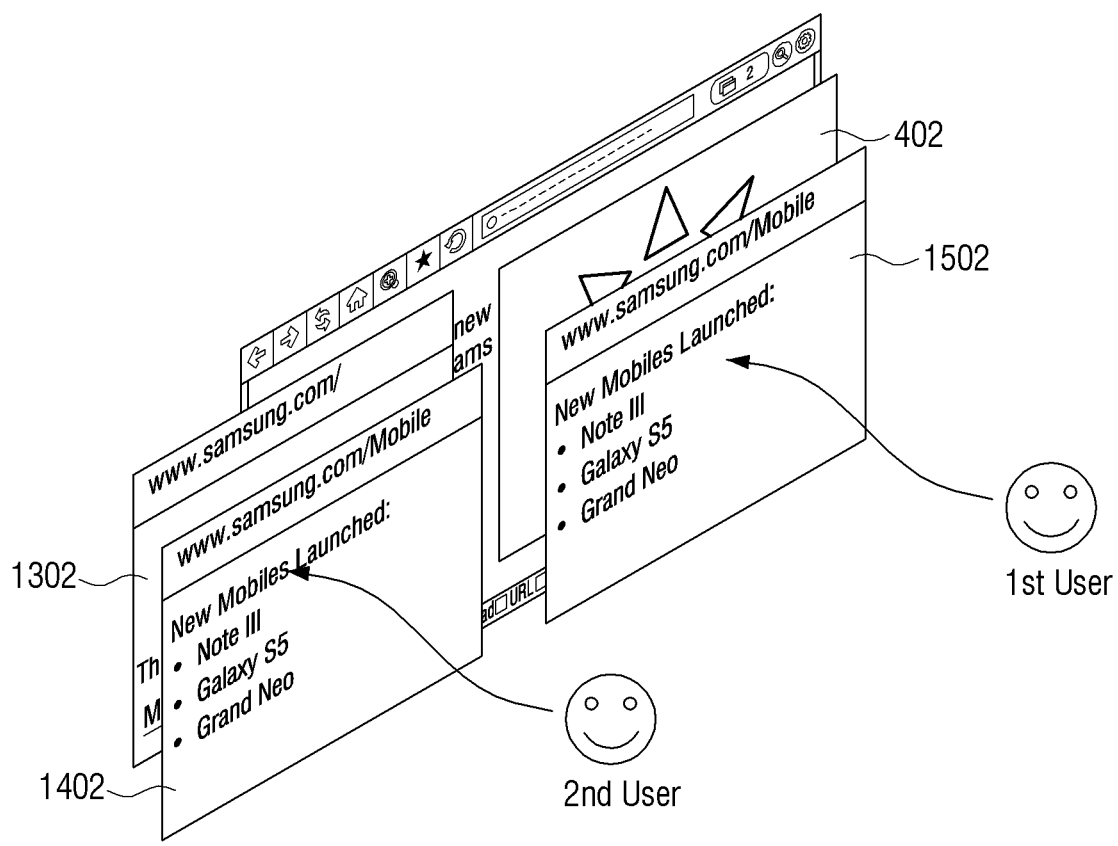
FIG. 15E illustrates creation and display of a new viewing pane viewable by the first user upon detecting a sharing command from the second user, the sharing command pertaining to sharing of the fifth viewing pane with the first user.

Referring to FIGS. 15D and 15E, the interaction method 100 may further include sensing sharing, by the second user, the fifth viewing pane 1402 with the first user. In response to the sensing, the interaction method 100 generates a new viewing pane 1502 to be viewed by the first user and displays the content of the fifth viewing pane 1402 on the new viewing pane 1502.

Figure 16A:
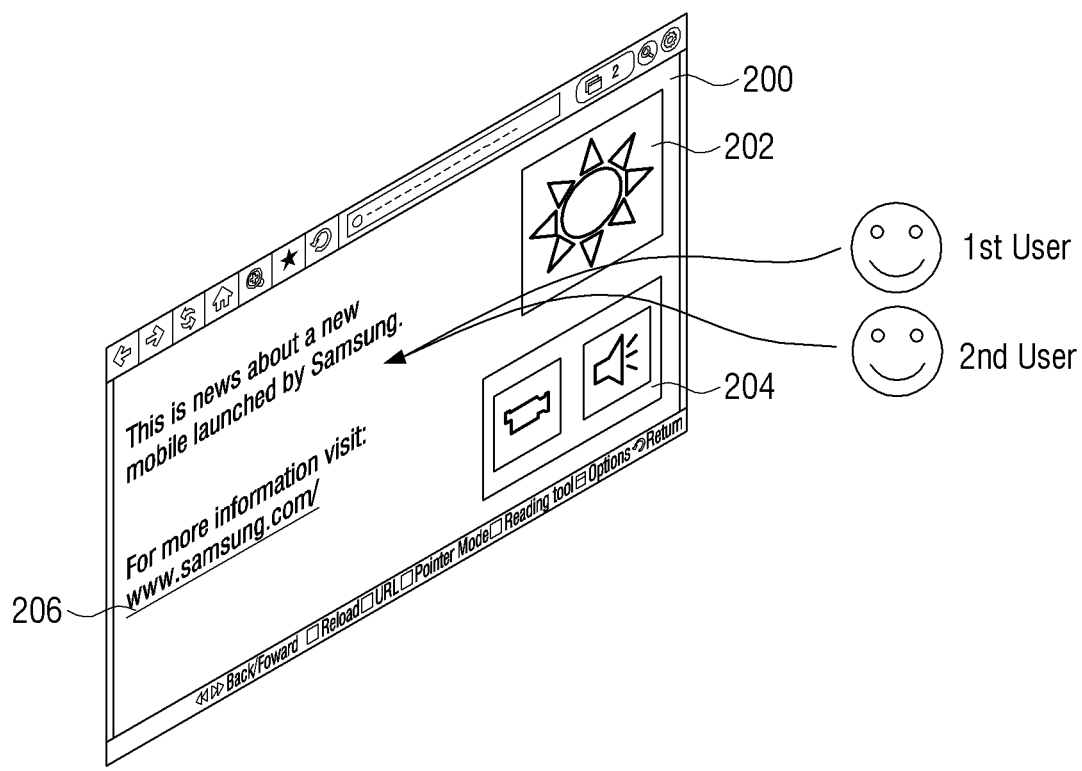
FIG. 16A illustrates display of a first viewing pane to a first user and a second user.
Figure 16B:
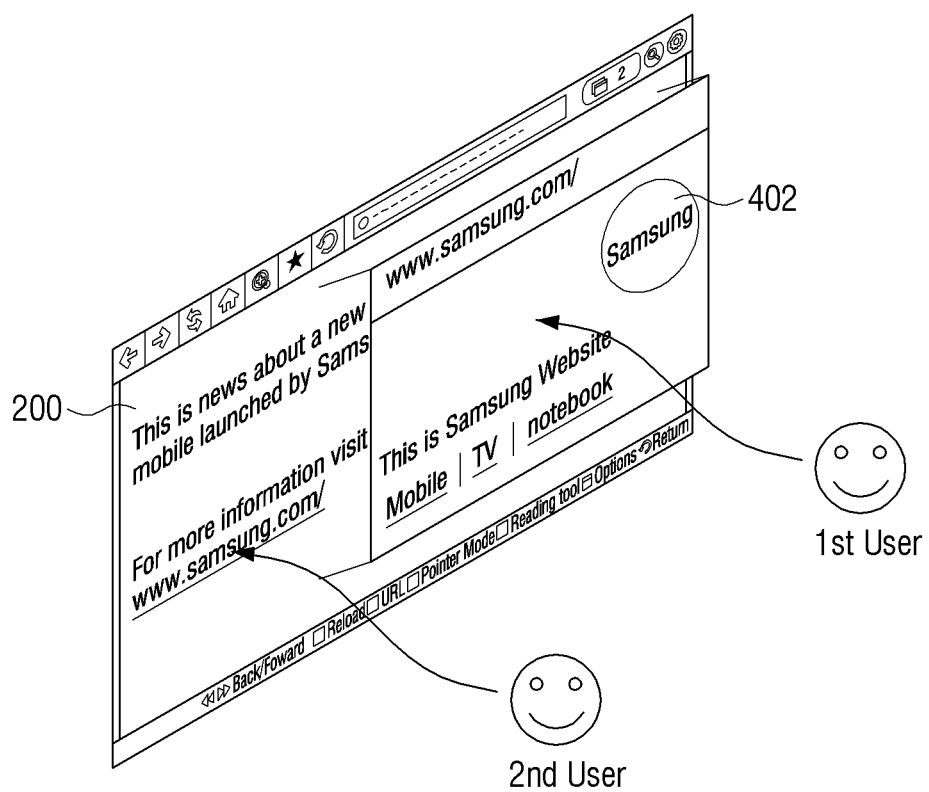
FIG. 16B illustrates display of a second viewing pane viewable only by the first user and comprising information linked to an object selected by the first user from the first viewing pane.
Figure 16C:
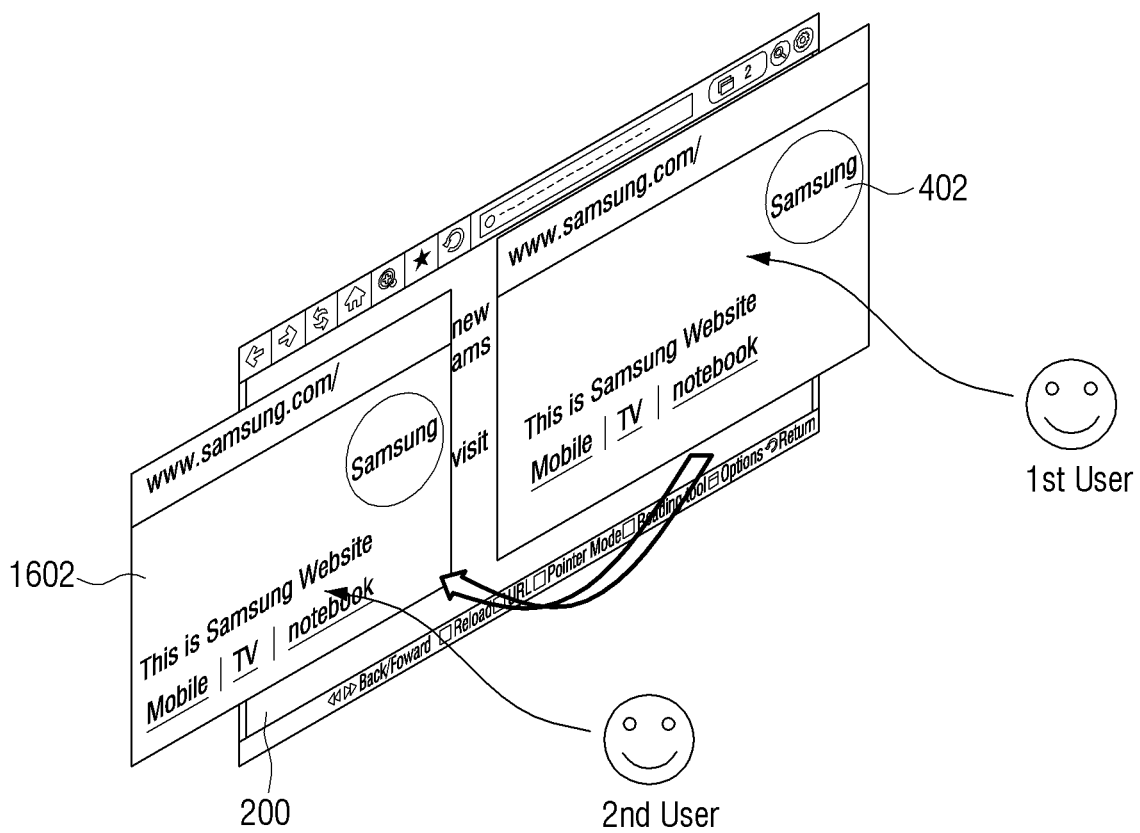
FIG. 16C illustrates creation and display of a new viewing pane viewable by the second user upon detecting a sharing command from the first user, the sharing command pertaining to sharing of the second viewing pane with the second user.

FIGS. 16A to 16C are similar to FIGS. 15A to 15D, but illustrate operations in reverse.

Referring to FIG. 16A, the first viewing pane 200 is displayed for the first user and the second user. When selection of an object by the first user is sensed and the multiple-user mode is in the on-state, and the selected object or the information linked with the selected object is displayed on the second viewing pane 402, the second viewing pane 402 is viewed only by the first user as shown in FIG. 16B.

When the second user continues viewing the first viewing pane 200 and a first user's command to share the second viewing pane 402 with the second user is sensed, the interaction method 100 generates a new viewing pane 1602 and displays the content of the second viewing pane 402 on the viewing pane 1602. In addition, in response to the sensing the sharing command, a single viewing pane to be viewed by the first user and the second user may be generated.

One or more viewing panes may be interpreted as a graphical user interface. Therefore, according to an exemplary embodiment, a graphical user interface including a first viewing pane displaying a web content including at least one object, and a second viewing pane displaying a selected object or information linked with the selected object in the 3D form may be provided.

Figure 17:
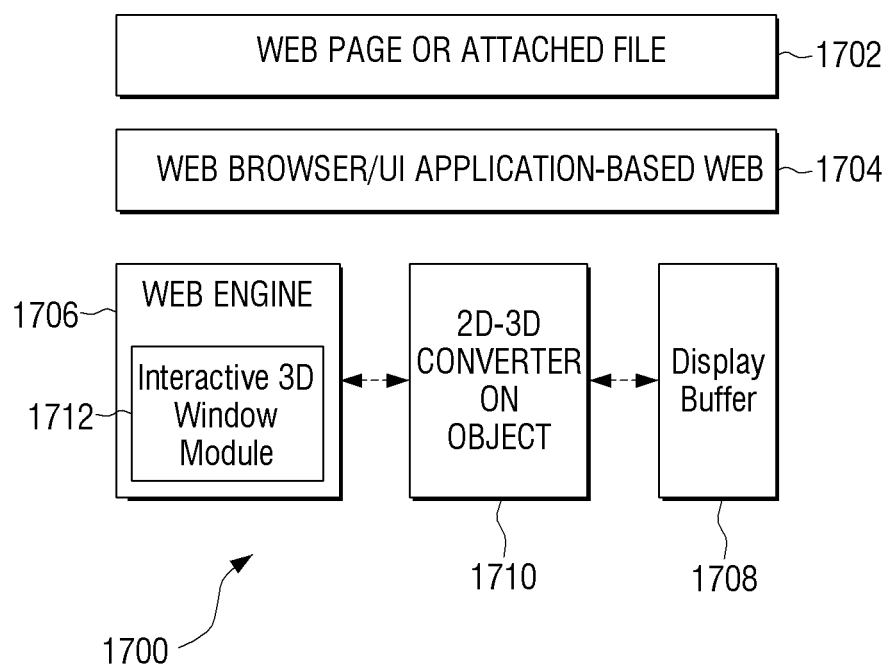
FIG. 17 illustrates a system for allowing interaction in accordance with an exemplary embodiment.

In view of an aspect of a system, the above-described method may be performed by a system as shown in FIG. 17. The system described in this description may be implemented by an electronic device.

Referring to FIG. 17, the system 1700 which performs the above-described method includes a module for receiving and storing web content 1702. This module is linked to provide a 3D effect to web content received from a web browser or a user interface (UI) module 1704. The web module 1702 based on the web browser or UI is additionally linked with a web engine 1706 and a display buffer 1708.

According to an exemplary embodiment, the web engine 1706 may detect an operation of a user.

According to an exemplary embodiment, the system 1700 may further include a converter module to convert an object or information linked with a selected object from a 2D form into a 3D form by performing the above-described process. The system 1700 may further include a 3D window module 1712 to arrange the first viewing pane 200 and the second viewing pane 402 at different perceivable depths.

The interaction method 100 according to exemplary embodiments may be controlled by a plurality of users independently and may be performed by consumer product which is able to display an image in a 3D form and is usable by a plurality of users. Thus, the present disclosure provides an interaction method including: displaying web content including at least one object on a first viewing pane; sensing or detecting a selection of at least one object by the first user; sensing or detecting a selection of at least one object by a second user; displaying the object selected by the first user or information linked with the object selected by the first user on a second viewing pane in a 3D form; and displaying an object selected by the second user or information linked with the object selected by the second user on a third viewing pane in the 3D form.

In the above-described exemplary embodiment, the interaction method may further include converting the selected object or the information linked with the selected object from the 2D form into the 3D form. In view of the above-mentioned aspect, each of the second viewing pane and the third viewing pane is arranged to be perceived at a different depth with respect to the first viewing pane. Additionally, the interaction method may include sensing interaction of the first user with the second viewing pane and displaying the result of the interaction on a fourth viewing pane; and/or sensing interaction of the second user with the third viewing pane and displaying the result of the interaction on a fifth viewing pane.

According to the above-described exemplary embodiment, a graphical user interface may include a first viewing pane which displays web content, the web content including at least one object. A second viewing pane which displays an object selected by the first user or information linked with the object selected by the first user in a 3D form selected by the first user. In addition, a third viewing pane which displays an object selected by the second user or information linked with the object selected by the second user in the 3D form.

In order to perform the above-described method, an exemplary embodiment may also provide an interaction system including a user interface engine configured to display web content a first viewing pane, the web content including at least one object. The interaction system may also include a sensing module configured to sense selection of at least one object by a first user and sense selection of at least one object by a second user and an interactive 3D module configured to display the object selected by the first user or information linked with the object selected by the first user on a second viewing pane, and display the object selected by the second user or information linked with the object selected by the second user on a third viewing pane.

In the above-described exemplary embodiment, the selected object or the information linked with the selected object may be displayed on an appropriate viewing pane (for example, the second, third, fourth, fifth, or sixth viewing pane) in the 3D form. In an another exemplary embodiment, it should be noted that the second, third, fourth, fifth, or sixth viewing pane may be arranged to be perceived at a different depth with respect to the first viewing pane and the selected object or the information linked with the selected object does not need to be displayed in the 3D form. This will be explained in detail in the following description. In an exemplary embodiment, the displaying the selected object or the information linked with the selected object in the 3D form may be optional.

Figure 18B:
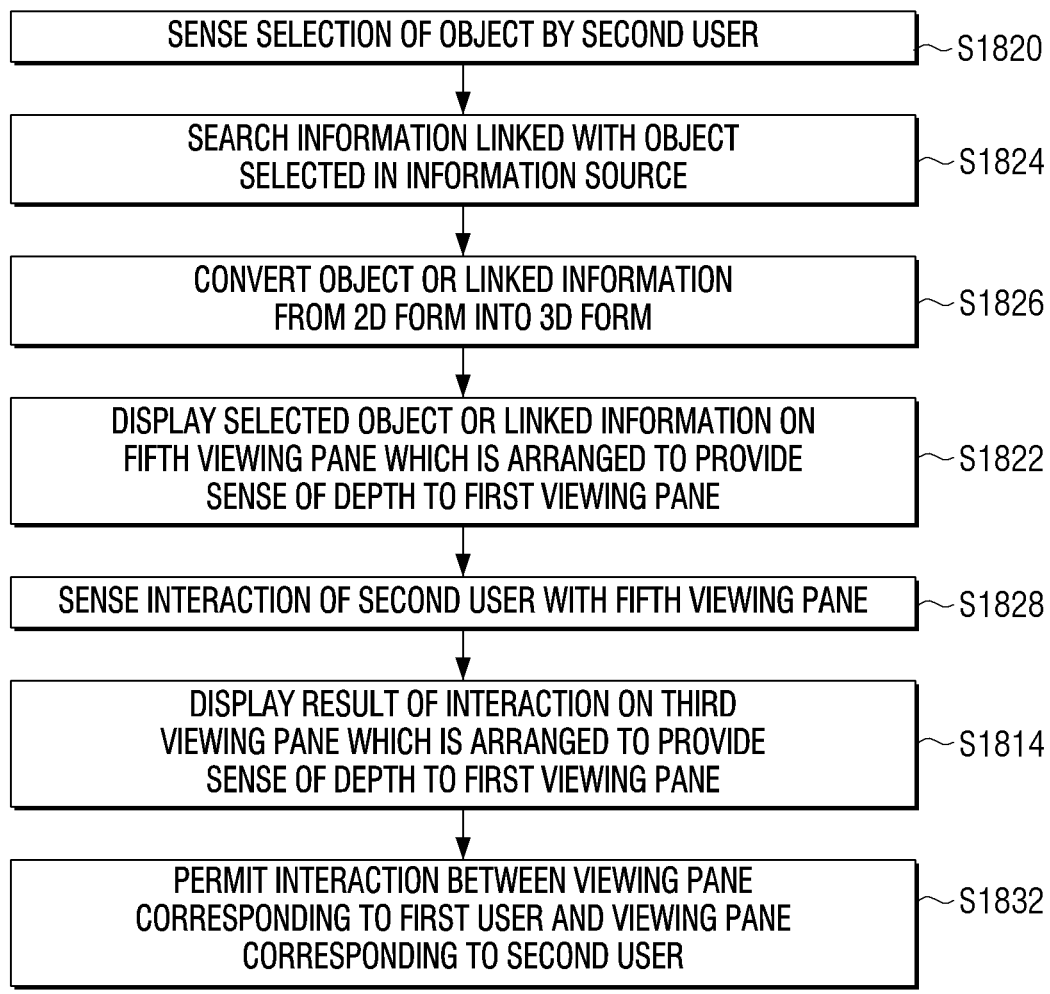

According to an exemplary embodiment shown in FIGS. 18A and 18B, an interaction method 1800 includes: displaying a web content including at least one object on a first viewing pane (operation S1802); sensing or detecting a selection of at least one object by a first user (operation S1804); and displaying a second viewing pane including the selected object or information linked with the selected object (operation S1806). The second viewing pane includes a second view window to be perceived at a different depth with respect to the first viewing pane.

According to another exemplary embodiment, the interaction method 1800 may further include searching for the information linked with the selected object and retrieving the information from an information source (operation S1808).

According to an exemplary embodiment, the second viewing pane may display the selected object or the information linked with the selected object in the 2D form. However, according to another exemplary embodiment, the second viewing pane may display the selected object or the information linked with the selected object in the 3D form.

When the selected object or the information linked with the selected object is in the 2D form, and the user controls the first viewing pane to display the selected object or the information linked with the selected object in the 3D form, the interaction method 1800 may further include converting the selected object or the information linked with the selected object from the 2D form into the 3D form (operation S1810).

According to another exemplary embodiment, the interaction method 1800 may further include sensing interaction of the user with the second viewing pane (operation S1812), and displaying the result of the interaction (operation S1814). According to an exemplary embodiment, the result of the interaction may be displayed on a third viewing pane. According to an exemplary embodiment, the third viewing pane is arranged to be perceived at a different depth with respect to the second viewing pane. In particular, the third viewing pane may be arranged at a different depth than the second viewing pane.

In addition, the interaction method 1800 may further include sensing or detecting a selection of an additional object by the first user on the first viewing pane (operation S1816), and displaying the selected object or information linked with the selected object on a fourth viewing pane (operation S1818). The fourth viewing pane may be arranged to be perceived at a different depth with respect to the first viewing pane. According to an exemplary embodiment, the fourth viewing pane may be configured to display the selected object or the information linked with the selected object in the 2D or 3D form.

In addition, the interaction method 1800 may further include sensing or detecting a selection of an object by a second user on the first viewing pane (operation S1820), and displaying the object selected by the second user or information linked with the object selected by the second user on a fifth viewing pane (operation S1822). The fifth viewing pane may be arranged to be perceived at a different depth with respect to the first viewing pane.

In addition, the interaction method 1800 may further include searching for the information linked with the object selected by the second user and obtaining the information from an information source (operation S1824).

According to an exemplary embodiment, the fifth viewing pane displays the object selected by the second user or the information linked with the object selected by the second user in the 2D or 3D form. When the object selected by the second user or the information linked with the object selected by the second user is in the 2D form, and the second user wishes to display the object selected by the second user or the information linked with the object selected by the second user on the fifth viewing pane in the 3D form, the interaction method 1800 may further include converting the object selected by the second user or the information linked with the object selected by the second user from the 2D form into the 3D form (operation S1826).

In addition, the interaction method 1800 may further include sensing or detecting an additional interaction of the second user with the fifth viewing pane (operation S1828), and displaying the result of the interaction (operation S1830). According to an exemplary embodiment, the result of the interaction may be displayed on a sixth viewing pane. The sixth viewing pane may be arranged to be perceived at a different depth with respect to the fifth viewing pane.

In addition, the interaction method 1800 may further include permitting interaction between the viewing pane corresponding to the first user and the viewing pane corresponding to the second user (operation S1832).

Figure 19:
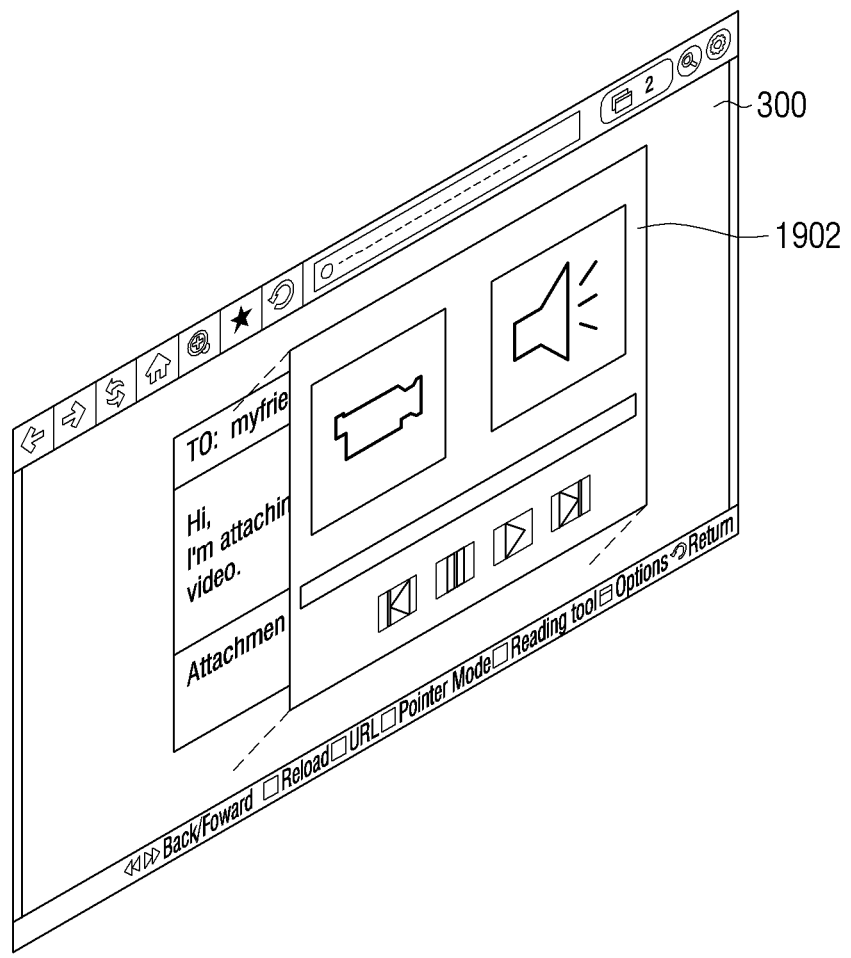
FIG. 19 illustrates a second viewing pane displaying a selected multimedia object, with the second viewing pane being arranged to be perceived at a different depth than the first viewing pane.

An aspect of the above-described interaction method 1800 is illustrated in FIG. 19. As shown in FIG. 3, a first viewing pane 300 displaying an email is displayed, and a second viewing pane 1902 displaying multimedia which is an attached file included in the first viewing pane 300 may be displayed along with the second viewing pane 1902 which is arranged to be perceived at a different depth with respect to the first viewing pane 300.

Figure 20:
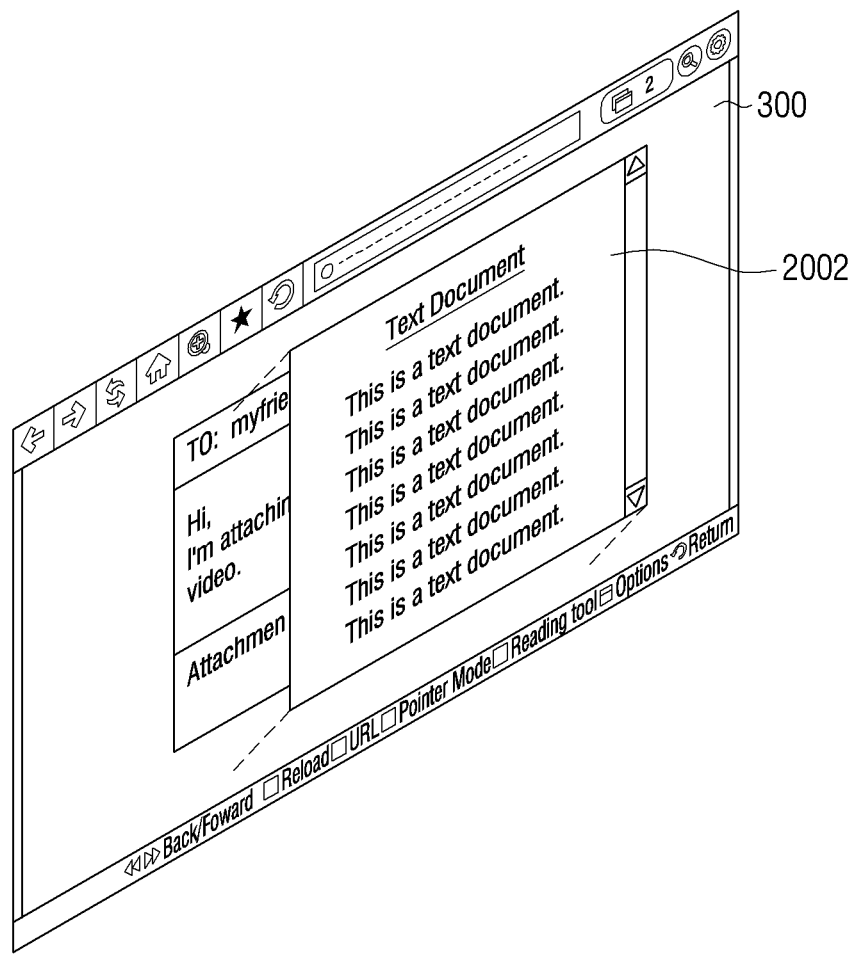
FIG. 20 illustrates a second viewing pane displaying a selected text object, with the second viewing pane being arranged to be perceived at a different depth than the first viewing pane.

In FIG. 20, a first viewing pane 300 displaying an email is displayed as in FIG. 3, and a second viewing pane 2002 displaying a text which is an attached file included in the first viewing pane 300 may be displayed along with the second viewing pane 2002 which is arranged to be perceived at a different depth with respect to the first viewing pane 300.

When the above-described interaction method 1800 is implemented, a graphical user interface including a first viewing pane which displays a web content 300 including at least one object 302, 304; and a second viewing pane 1902, 2002 which displays a selected object or information linked with the selected object is obtained, and the second viewing pane 1902, 2002 is arranged to be perceived at a different depth with respect to the first viewing pane 300.

In order to implement the above-described interaction method 1800, the present disclosure also provides: a user interface engine configured to display a web content including at least one object on a first viewing pane; a sensing module configured to sense selection of at least one object by a first user; and an interactive 3D module configured to display the selected object or information linked with the selected object on a second viewing pane, and the second viewing pane is arranged to be perceived at a different depth with respect to the first viewing pane.

Figure 21:
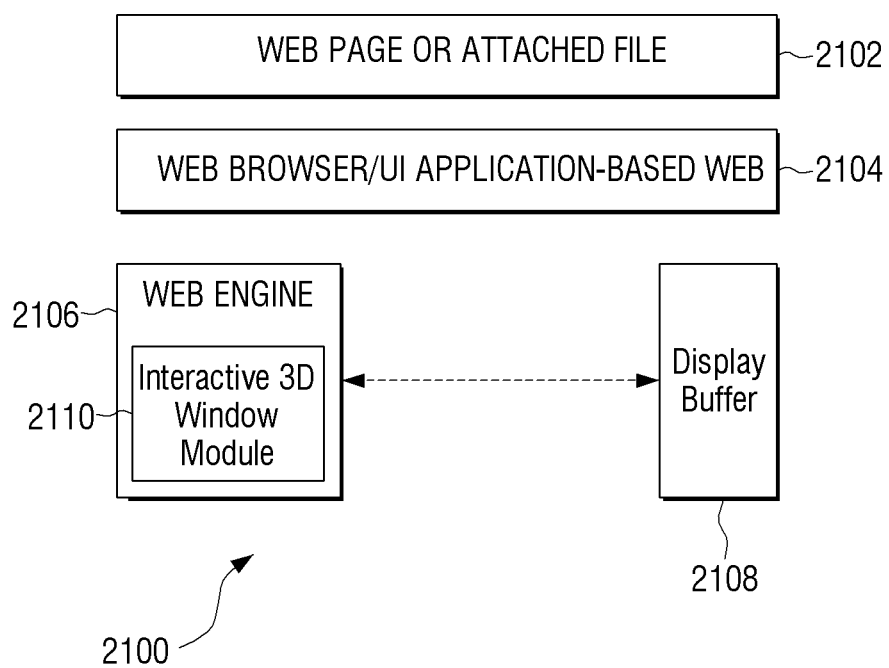
FIG. 21 illustrates a system for allowing interaction in accordance with an another exemplary embodiment.

According to an aspect of an exemplary embodiment, a system 2100 includes a module 2102 for searching and storing web content as shown in FIG. 21. This module is operably connected with a web browser or UI module 2104-based web content. The web browser or UI module 2104-based web content is additionally connected with a web engine 2106 and a display buffer 2108. According to an aspect of an exemplary embodiment, the web engine 2106 may sense or detect a selection by a user. In addition, the system 2100 may further include an interactive 3D window module 2110 to arrange the first viewing pane and the second viewing pane at different depths.

The interactive 3D window module 2110 may arrange an additional viewing pane to be displayed at a desired depth with respect to a desired window. For example, the interactive 3D window module 2110 may arrange the third viewing pane to be perceived at a different depth than the second viewing pane, arrange the fourth viewing pane to be perceived at a different depth than the fifth viewing pane, arrange the fifth viewing pane to be perceived at a different depth than the first viewing pane, and arrange the sixth viewing pane to be perceived at a different depth than the fifth viewing pane.

The interaction method 2100 according to exemplary embodiments may be controlled by a plurality of users independently or may be performed to benefit a consumer product which is able to display an image in a 3D form and is usable by a plurality of users. Thus, the present disclosure provides an interaction method including: displaying a web content including at least one object on a first viewing pane; sensing or detecting a selection of at least one object by a first user; sensing or detecting selection of at least one object by a second user; displaying the object selected by the first user or information linked with the object selected by the first user on a second viewing pane in a 3D form; and displaying an object selected by the second user or information linked with the object selected by the second user on a third viewing pane in the 3D form. The second viewing pane and the third viewing pane do not overlap, and each of the second viewing pane and the third viewing pane may be arranged at different depths in order to be perceived at a different depth than the first viewing pane.

According to another exemplary embodiment, each of the first viewing pane and the third viewing pane may display the selected object or the information linked with the selected object in the 2D or 3D form.

In addition, the interaction method 2100 may further include converting the selected object or the information linked with the selected object from the 2D form into the 3D form.

In addition, the interaction method 2100 may further include sensing or detecting an interaction of the first user with the second viewing pane and displaying the result of the interaction on a fourth viewing pane; and/or sensing or detecting an interaction of the second user with the third viewing pane and displaying the result of the interaction on a fifth viewing pane.

According to an exemplary embodiment, the interaction method 2100 may further include permitting interaction between the viewing pane corresponding to the first user and the viewing pane corresponding to the second user. According to an exemplary embodiment, the interaction method 2100 may further include permitting to share the viewing pane corresponding to the first user with the second user or to share the viewing pane corresponding to the second user with the first user.

In addition, when the above-described interaction method 2100 is implemented, a graphical user interface is generated, and the graphical user interface includes: a first viewing pane which displays a web content including at least one object; a second viewing pane which displays an object selected by a first user or information linked with the object selected by the first user; and a third viewing pane which displays an object selected by a second user or information linked with the object selected by the second user. The second viewing pane and the third viewing pane may not overlap with each other or may only least partially overlap, and each of the second viewing pane and the third viewing pane is arranged to be perceived at a different depth than the first viewing pane.

According to an exemplary embodiment, a system to implement the above-described interaction method 2100 includes: a user interface engine configured to display a web content including at least one object on a first viewing pane; a sensing module configured to sense selection of at least one object by a first user and sense selection of at least one object by a second user; and an interactive 3D module configured to display the object selected by the first user or information linked with the object selected by the first user on a second viewing pane, and display the object selected by the second user or information linked with the object selected by the second user on a third viewing pane, and the second viewing pane and the third viewing pane may not overlap with each other or may only partially overlap and each of the second viewing pane and the third viewing pane may be arranged to be perceived at different depths with respect to the first viewing pane.

Figure 22:
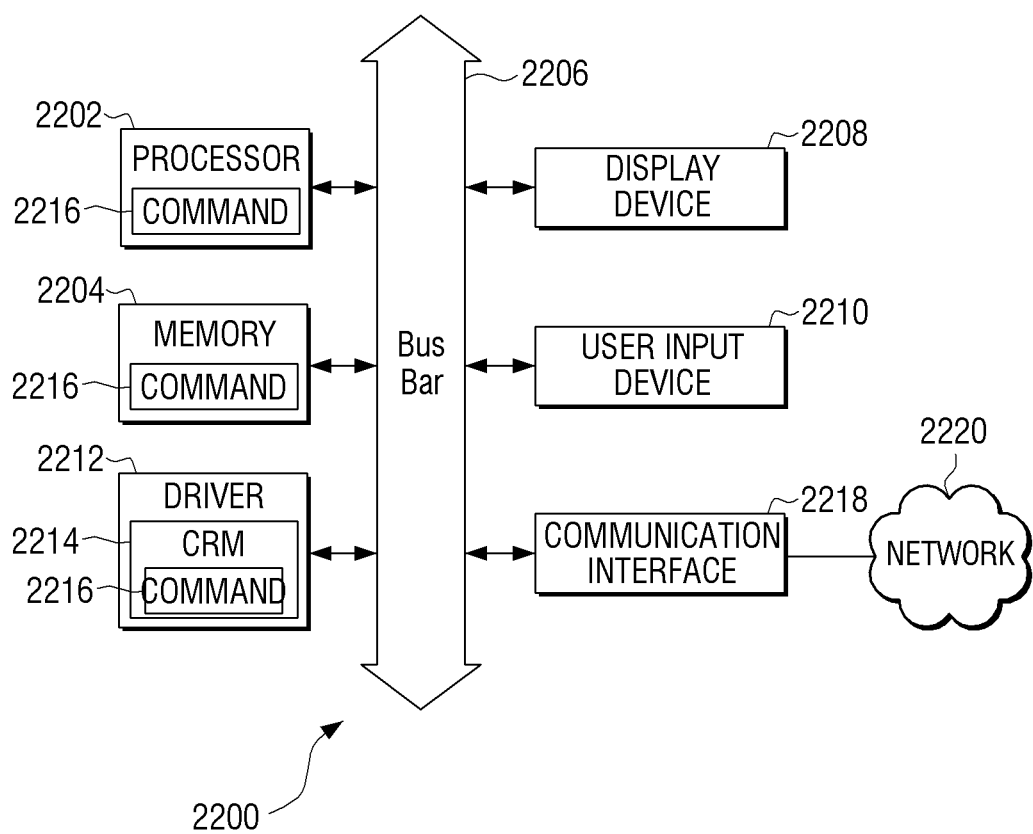
FIG. 22 illustrates a detailed diagram of the system illustrated either in FIG. 17 or in FIG. 21.

FIGS. 11 and 21 illustrate the block diagram of the system, whereas FIG. 22 illustrates a hardware configuration of a system in the form of a computer system 2200.

The computer system 2200 may include a set of commands which are executed to perform one or more of the interaction methods 100 initiated by the computer system 2200. The computer system 2200 may be connected with another computer system or peripheral devices via a network, or may be operated as an independent device.

In an established network, the computer system 2200 may be operated as a client user computer in capacity of a server or a server-client network environment, or may be operated as a peer computer system in a peer-to-peer (or a distributed type) network environment. The computer system 2200 may be executed by a Personal Computer (PC), a tablet PC, a set-top box (STB), a Personal Digital Assistant (PDA), a mobile device, a palmtop computer, a laptop computer, a desktop computer, a communication device, a wireless phone, a LAN wire phone, a control system, a camera, a scanner, a facsimile machine, a printer, a pager, a personal trusted device, a web appliance, a network router, a switch or a bridge, or any other devices which can execute a set of specified commands of a specific action made by the above-mentioned devices. Furthermore, although a single computer system 2200 is illustrated, the term "system" may include a system which executes a command to perform a single or one or more computer functions individually or commonly executes a single set or a plurality of sets, or a certain collection of sub systems.

The computer system 2200 may include a processor 2202 (for example, a central processing unit (CPU) or a graphics processing unit (GPU), or both of them). The processor 2202 may be a configuration of various systems. For example, the processor 2202 may be a part of a standard personal computer or a workstation. The processor 2202 may be one or more normal processors, a digital signal processor, an application-specific integrated circuit, field programmable gate arrays, a server, a network, a digital circuit, an analogue circuit, a combination of them, or a device which is currently developed or will be developed in the future to analyze and process data. The processor 2202 may implement a manually generated code or a software program (that is, programming).

The computer system 2200 includes a memory 2204 to communicate via a bus 2208. The memory 2204 may be a main memory, a static memory, or a dynamic memory. The memory 2204 may include various types of computer-readable storage media such as non-volatile and volatile storage media, but is not limited to these, and may include a Read Only Memory (ROM), a programmable ROM (PROM), an electronically programmable ROM (EPROM), an electronically erasable ROM (EEPROM), a flash memory, a magnetic disk or tape, an optical disk, or the like, but is not limited to these. For example, the memory 2204 includes a cache or an access memory for the processor 2202. In an exemplary embodiment, the memory 2204 may be separated from the processor 2202 like a cache memory, a system memory, or other memories of the processor 2202. The memory 2204 may be an external storage device or a database for storing data. For example, the memory 2204 may include a hard drive, a compact disk (CD), a digital video disk (DVD), a memory card, a memory stick, a floppy disk, a universal serial bus (USB), a memory device, or any other devices which are operated to store data.

The memory 2204 may be configured to store commands which are executable by the processor 2202. A function, act, and task illustrated in the figures may be performed by the processor 2202 which is a program for performing commands stored in the memory 2204. The function, act, and task have nothing to do with a set of commands, a storage medium, a processor, or a specific type of processing strategy, and may be performed by software, hardware, an integrated circuit, firm-ware, micro-code, etc. which is operated solely or in combination. The processing strategy may include multiprocessing, multitasking, parallel processing, etc.

As shown in the drawing, the computer system 2200 may further include a display 2208 such as a liquid crystal display (LCD), an organic light emitting diode (OLED), a flat panel display, a solid state display, a cathode ray tube (CRT), a projector, a printer, or other display devices which are currently known or will be developed in the future to output determined information, or may not include the above-mentioned devices.

The display 2208 may act as an interface to allow a user to view the function of the processor 2202. Specifically, the display 2208 may act as an interface with software stored in the memory 2204 or a driver 2212.

The display 2208 may display an image in the 3D form. Additionally, the display 2208 may be viewed or controlled by a plurality of users.

Additionally, the computer system 2200 may include an input device 2210 which is configured to allow a user to interact with a certain configuration of the computer system 2200. The input device 2210 may be a number keypad, a keyboard, or a cursor control device such as a mouse or a joystick, a touch viewing pane display, a remote controller, an air gesture receiver, a voice command receiver, or any other devices which are operated to interact with the computer system 2200.

The computer system 2200 may include a disk or an optical driver 2212. The disk or optical driver 2212 may include a computer readable medium (CMR) having a set of one or more commands 2216 embedded therein (for example, software). Furthermore, the command 2216 may implement one or more methods or logics as described above. In a specific example, the command 2216 may exist in the processor 2202 or the memory 2204 completely or at least partially while being executed by the computer system 2200. The memory 2204 and the processor 2202 may include a computer readable medium as described above.

A device connected with a network 2220 may consider the computer readable medium 2214 which includes the command 2216 to communicate a voice, video, audio, image or any other data via the network, and receives and execute the command 2216 in response to a propagated signal. Furthermore, the command 2216 may be transmitted or received via the network 2220, a communication port or an interface 2218 or a bus bar 2206.

The communication port or the interface 2218 may be a part of the processor 2202 or a separated configuration. The communication port 2218 may be generated in software or a physical access to hardware. The communication port 2218 may be configured to connect with the network 2220, an external media, the display 2208, or any other configuration of the system 2200, or a combination of them. The connection with the network 2220 may be set as physical access such as wired Ethernet connection or wireless connection which will be described below. As described above, additional access with other configurations of the system 2200 may be set as physical access or wireless connection.

Alternatively, the network 2220 may be directly connected with the bus 2206.

The network 2220 may include a wired network, a wireless network, an Ethernet AVB network or a combination thereof. The wireless network may be a cellular telephone network, 802.11, 802.16, 802.20, 802.1Q, or a WiMax network. Furthermore, the network 2226 may be a common network such as the Internet, a personal network such as Intranet, or a combination thereof, and is not limited to a TCP/IP which may utilize various networking protocols which are currently available or will be developed in the future, but are based on networking protocols.

In an another example, dedicated hardware such as an application-specific integrated circuit, programmable logic arrays, and other hardware devices may be configured to implement various parts of the system 2200.

An application including the systems may include a variety of electronic devices and computer systems. One or more examples may use a device related to data signals, which are communicable between modules through one or more specific hardware modules or control modules, or may implement a function as a part of the application-specific integrated circuit. Therefore, the system of the present disclosure may include execution of hardware, firmware, or hardware.

Figure 23:
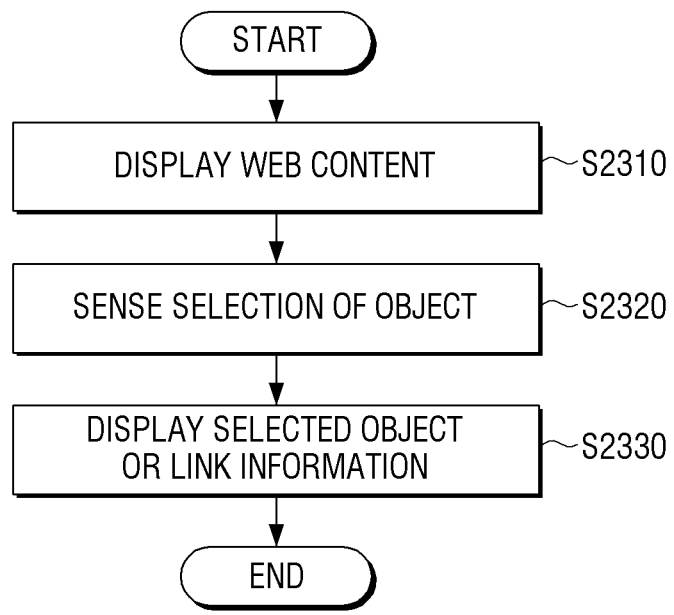
FIG. 23 illustrates a flowchart to explain an interaction method according to an exemplary embodiment.

FIG. 23 illustrates a flowchart showing an interaction method according to an exemplary embodiment. Specifically, an electronic device 1000 may display web content including at least one object on a first viewing pane (operation S2310). In this case, the object may be one of an image, video, text, hyperlink, reference document, multimedia, etc. In response to an object being selected by a user (operation S2320), the electronic device may display the selected object or information linked with the selected object on a new viewing pane in the 3D form (operation S2330). In this case, the new viewing pane may be displayed to be perceived at a different depth with respect to an existing viewing pane.

When the selected object or the information linked with the selected object includes an object, the user may select the object displayed on the new viewing pane. When the new object is selected, the above-described process may be repeated.

In addition, a plurality of users may search different for contents using a single device simultaneously. For example, it is assumed that a multi-user mode is in the on-state and a first user and a second user are viewing the first viewing pane which displays the web content including at least one object. In response to the first user selecting an object, the selected object or information linked with the selected object may be displayed on a second viewing pane, and the second viewing pane may be viewed only by the first user and may not hinder the second user from viewing the first viewing pane.

In addition, the plurality of users may share their contents with one another while searching different contents using a single device simultaneously. For example, it is assumed that the multi-user mode is in the on-state and the first user and the second user are viewing the first viewing pane which displays the web content including at least one object. In response to the first user selecting an object, the object selected by the first user or the information linked with the selected object may be displayed on the second viewing pane, and the second viewing pane may be viewed only by the first user and may not hinder the second user from viewing the first viewing pane. In this case, in response to a sharing mode being executed, not only the first user but also the second user may view the second viewing pane.

Figure 24:
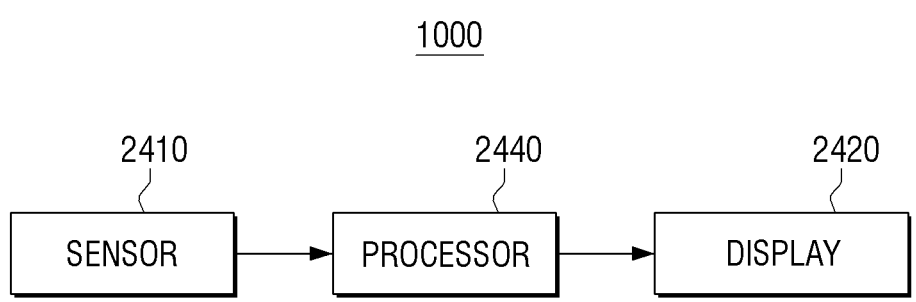
FIG. 24 illustrates a block diagram schematically showing a configuration of an electronic device according to an exemplary embodiment.

FIG. 24 illustrates a block diagram showing a configuration of an electronic device 1000 according to an exemplary embodiment. As shown in FIG. 24, the electronic device 1000 includes a sensor 2410, a display 2420, and a processor 2440.

The electronic device 1000 may be a desktop PC. However, this is merely an example, and the electronic device 1000 may be implemented by using other display devices which display web content, such as a tablet PC, a notebook PC, a smart TV, etc.

The sensor 2410 senses a user command to control the electronic device 1000. In particular, when a web content including at least one object is displayed, the sensor 2410 may sense selection of an object by a user. In addition, the sensor 2410 may sense a user command to set various modes (a multi-user mode or a sharing mode) of the electronic device. In this case, the sensor 2410 may be implemented by using a touch sensor. However, this is merely an example, and the sensor 2410 may be implemented by using various input devices to receive a user command (for example, a remote control signal sensor, a mouse, a keyboard, etc.).

The display 2420 outputs video data under the control of the processor 2440. In particular, the display 2420 may display an object selected by the user or information linked with the object selected by the user on one of the first to n-th viewing panes. In this case, the viewing pane may be a window and may display content in a box or a frame. In addition, the object may be one of an image, video, text, hyperlink, reference document, multimedia, and others.

The processor 2440 controls the overall operation of the electronic device 1000 according to a user command inputted through the sensor 2410. In particular, in response to selection of an object by a user being sensed by the sensor 2410, the processor 2440 may control the display 2420 to display the selected object or information linked with the selected object in a new viewing pane in the 3D form. In addition, when the selected object or the information linked with the selected object is in the 2D form, the processor 2440 may control the converter module to convert the selected object or the information linked with the selected object from the 2D form into the 3D form, and control the display 2420 to display the object of the 3D form or the information linked with the selected object of the 3D form. In addition, the processor 2440 may control the display 2420 to display the new viewing pane to be perceived at a different depth with respect to the existing viewing pane.

In addition, the processor 2440 may search the information linked with the selected object from an information source. Specifically, the processor 2440 may search the information linked with the selected object from the information source via various communication modules.

According to an exemplary embodiment, a web content including a first viewing pane including at least one object is displayed, and, in response to selection of an object by a first user being sensed by the sensor 2410, the processor 2440 may control the display 2420 to display the object selected by the first user or information linked with the selected object on a second viewing pane. In this case, the sensor 2410 may sense interaction of the first user with the second viewing pane, and the processor 2440 may control the display 2420 to display the result of the interaction on a third viewing pane. In this case, the third viewing pane may be arranged to be perceived at a different depth with respect to the second viewing pane.

In addition, in response to selection of an additional object by the first user on the first viewing pane being sensed by the sensor 2410, the processor 2440 may control the display 2420 to display the object additionally selected by the first user or information linked with the additionally selected object on a fourth viewing pane. The processor 2440 may control the display 2420 to display the fourth viewing pane to be perceived at a different depth with respect to the first viewing pane.

According to another exemplary embodiment, when the electronic device 1000 is in a multi-user mode, a first viewing pane displaying a web content including at least one object for the first user and the second user may be displayed. In response to selection of an object by the first user being sensed by the sensor 2410, the processor 2440 may control the display 2420 to display the object selected by the first user or information linked with the object on the second viewing pane. The processor 2440 may control the display 2420 to display the second viewing pane only for the first user.

According to another exemplary embodiment, the electronic device 1000 may be in the multi-user mode, and a first viewing pane displaying a web content including at least one object for the first user and the second user may be displayed. In response to selection of an object by the first user being sensed by the sensor 2410, the processor 2440 may control the display 2420 to display the object selected by the first user or information linked with the object on the second viewing pane. In response to a sharing mode command by the first user or the second user being sensed by the sensor 2410, the processor 2440 may control the display 2420 to display the second viewing pane for the first user and the second user.

In addition, the processor 2440 may include a converter module, an interactive 3D module, a web module, and an interactive 3D window module. The converter module displays web content in the 3D form under the control of the processor 2440. The converter module 2430 generates a double size drawing buffer (a left-eye frame buffer and a right-eye frame buffer) to support drawing divided for a left-eye frame and a right-eye frame. The converter module renders a copy of an object to be displayed in the 3D form to each half of the double size buffer, and then combines the left-eye frame buffer and the right-eye frame buffer to make a 3D effect Applications that may include the systems can broadly include a variety of electronic and computer systems. One or more examples described may implement functions using two or more specific interconnected hardware modules or devices with related control and data signals that can be communicated between and through the modules, or as portions of an application-specific integrated circuit. Accordingly, the present system encompasses software, firmware, and hardware implementations.

The system described may be implemented by software programs executable by a computer system. Further, in a non-limited example, implementations can include distributed processing, component/object distributed processing, and parallel processing. Alternatively, virtual computer system processing can be constructed to implement various parts of the system.

The system is not limited to operation with any particular standards and protocols. For example, standards for Internet and other packet switched network transmission (e.g., TCP/IP, UDP/IP, HTML, HTTP) may be used. Such standards are periodically superseded by faster or more efficient equivalents having essentially the same functions. Accordingly, replacement standards and protocols having the same or similar functions as those disclosed are considered equivalents thereof.

While specific language has been used to describe the disclosure, any limitations arising on account of the same are not intended. As would be apparent to a person in the art, various working modifications may be made to the method in order to implement the inventive concept as taught herein.

The drawings and the forgoing description show exemplary embodiments. Those skilled in the art will appreciate that one or more of the described elements may well be combined into a single functional element. Alternatively, certain elements may be split into multiple functional elements. Elements from one exemplary embodiment may be added to another exemplary embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the exemplary embodiments is by no means limited by these specific examples. Numerous variations, whether explicitly given in the specification or not, such as differences in structure, dimension, and use of material, are possible.

What is claimed is:

1. An interaction method of an electronic device, the interaction method comprising:
    displaying content comprising at least one object, on a first viewing pane that is perceived at a first depth and is viewable by a first user and a second user;
    in response to a first selection of the at least one object included in the content displayed on the first viewing pane being received from the first user while the electronic device is in a multi-user mode, displaying the at least one object that is selected or first information that is associated with the at least one object that is selected, on a second viewing pane that is perceived at a second depth different than the first depth and is viewable by only the first user, in a three dimensional (3D) form, while the content is displayed on the first viewing pane; and
    in response to the electronic device being switched from the multi-user mode to a sharing mode, based on a sharing command for sharing the at least one object or the first information displayed on the second viewing pane being received from the first user, displaying the at least one object or the first information on a third viewing pane that is perceived at the second depth and is viewable by only the second user, while the content is displayed on the first viewing pane and the at least one object or the first information is contemporaneously displayed on the second viewing pane.

2. The interaction method of claim 1, wherein the at least one object that is selected or the first information is in a two dimensional (2D) form, and
    the method further comprises converting the at least one object that is selected or the first information, from the 2D form into the 3D form, and
    the displaying the at least one object or the first information comprises displaying the at least one object or the first information that is converted, on the second viewing pane.

3. The interaction method of claim 1, further comprising:
    searching for the first information; and
    retrieving the first information linked with the at least one object that is found, from an information source.

4. The interaction method of claim 1, further comprising, in response to a user interaction with the at least one object or the first information displayed on the second viewing pane being received from the first user, displaying a result of the user interaction on a fourth viewing pane that is perceived at a third depth different than the first depth and the second depth and is viewable by only the first user, while the content is displayed on the first viewing pane and the at least one object or the first information is displayed on the second viewing pane.

5. The interaction method of claim 1, wherein the content that is displayed on the first viewing pane further comprises an additional object, and
    the method further comprises, in response to a second selection of the additional object included in the content displayed on the first viewing pane being received from the first user, displaying the additional object that is selected or second information that is linked with the additional object that is selected, on a fourth viewing pane that is perceived at the second depth and is viewable by only the first user, in the 3D form, while the content is displayed on the first viewing pane and the at least one object or the first information is displayed on the second viewing pane.

6. The interaction method of claim 5, wherein the method further comprises, in response to the second selection of the additional object included in the content displayed on the first viewing pane being received from the second user, displaying the additional object that is selected or the second information that is linked with the additional object that is selected, on a fifth viewing pane that is perceived at the second depth and is viewable by only the second user, in the 3D form, while the content is displayed on the first viewing pane, the at least one object or the first information is displayed on the second viewing pane, and the additional object or the second information is displayed on the fourth viewing pane.

7. The interaction method of claim 6, wherein, in response to the electronic device being in the sharing mode, an interaction between the second viewing pane corresponding to the first user and the third viewing pane corresponding to the second user is enabled.

8. The interaction method of claim 1, wherein the at least one object is any one or any combination of an image, a video, text, a hyperlink, an attached file, and multimedia.

9. An electronic device comprising:
    a display;
    a sensor; and a hardware processor configured to:
control the display to display content comprising at least one object, on a first viewing pane that is perceived at a first depth and is viewable by a first user and a second user;
in response to a first selection of the at least one object included in the content displayed on the first viewing pane being received from the first user via the sensor, while the electronic device is in a multi-user mode, control the display to display the at least one object that is selected or first information that is associated with the at least one object that is selected, on a second viewing pane that is perceived at a second depth different than the first depth and is viewable by only the first user, in a three dimensional (3D) form, while the content is displayed on the first viewing pane; and
in response to the electronic device being switched from the multi-user mode to a sharing mode, based on a sharing command for sharing the at least one object or the first information displayed on the second viewing pane being received from the first user via the sensor, control the display to display the at least one object or the first information on a third viewing pane that is perceived at the second depth and is viewable by only the second user, while the content is displayed on the first viewing pane and the at least one object or the first information is contemporaneously displayed on the second viewing pane.

10. The electronic device of claim 9, wherein the at least one object that is selected or the first information is in a two dimensional (2D) form, and
wherein the hardware processor is further configured to:
convert the at least one object that is selected or the first information, from the 2D form into the 3D form; and
control the display to display the at least one object or the first information that is converted, on the second viewing pane.

11. The electronic device of claim 9, wherein the hardware processor is further configured to:
search for the first information; and
retrieve the first information linked with the at least one object that is found, from an information source.

12. The electronic device of claim 9, wherein the hardware processor is further configured to, in response to a user interaction, by the first user, with the at least one object or the first information displayed on the second viewing pane being sensed by the sensor, control the display to display a result of the user interaction on a fourth viewing pane that is perceived at a third depth different than the first depth and the second depth and is viewable by only the first user, while the content is displayed on the first viewing pane and the at least one object or the first information is displayed on the second viewing pane.

13. The electronic device of claim 9, wherein the content that is displayed on the first viewing pane further comprises an additional object, and
the hardware processor is further configured to, in response to a second selection, by the first user, of the additional object included in the content displayed on the first viewing pane being sensed by the sensor, control the display to display the additional object that is selected or second information that is linked with the additional object that is selected, on a fourth viewing pane that is perceived at the second depth and is viewable by only the first user, in the 3D form, while the content is displayed on the first viewing pane and the at least one object or the first information is displayed on the second viewing pane.

14. The electronic device of claim 13, wherein the hardware processor is further configured to, in response to the second selection, by the second user, of the additional object included in the content displayed on the first viewing pane being sensed by the sensor, control the display to display the additional object that is selected or the second information that is linked with the additional object that is selected, on a fifth viewing pane that is perceived at the second depth and is viewable by only the second user, in the 3D form, while the content is displayed on the first viewing pane, the at least one object or the first information is displayed on the second viewing pane, and the additional object or the second information is displayed on the fourth viewing pane.

15. The electronic device of claim 14, wherein, in response to the electronic device being in the sharing mode, an interaction between the second viewing pane corresponding to the first user and the third viewing pane corresponding to the second user is enabled.

16. The electronic device of claim 9, wherein the at least one object is any one or any combination of an image, a video, text, a hyperlink, an attached file, and multimedia.

* * * * *